(12) United States Patent
Abedini et al.

(10) Patent No.: US 11,044,072 B2
(45) Date of Patent: Jun. 22, 2021

(54) OPTIMIZED SECONDARY SYNCHRONIZATION SIGNAL

(71) Applicant: QUALCOMM Incorporated, San Diego, CA (US)

(72) Inventors: Navid Abedini, Raritan, NJ (US); Sundar Subramanian, Bridgewater, NJ (US); Junyi Li, Chester, NJ (US); Muhammad Nazmul Islam, Edison, NJ (US); Juergen Cezanne, Ocean Township, NJ (US); Bilal Sadiq, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 15/367,475

(22) Filed: Dec. 2, 2016

(65) Prior Publication Data

US 2017/0353290 A1  Dec. 7, 2017

Related U.S. Application Data

(60) Provisional application No. 62/344,384, filed on Jun. 1, 2016.

(51) Int. Cl.
*H04L 7/00* (2006.01)
*H04W 56/00* (2009.01)
(Continued)

(52) U.S. Cl.
CPC ........ *H04L 7/0016* (2013.01); *H04J 11/0069* (2013.01); *H04J 11/0076* (2013.01);
(Continued)

(58) Field of Classification Search
CPC .................. H04L 7/0016; H04W 56/0015
See application file for complete search history.

(56) References Cited

U.S. PATENT DOCUMENTS 8,923,197 B2 * 12/2014 Pi ................. H04J 11/0069
370/328
2006/0262870 A1 11/2006 Khan
(Continued)

FOREIGN PATENT DOCUMENTS

| CN | 101606338 A | 12/2009 |
| CN | 102273160 A | 12/2011 |
| CN | 103814560 A | 5/2014 |

OTHER PUBLICATIONS

Huawei et al., "Remaining Details of D2D Synchronization Signals," 3GPP TSG RAN WG1 Meeting #78, R1-142843, Dresden, Germany, Aug. 18-21, 2014, 19 pgs., XP050815244, 3rd Generation Partnership Project.
(Continued)

*Primary Examiner* — Kevin C. Harper
*Assistant Examiner* — Derrick V Rose
(74) *Attorney, Agent, or Firm* — Holland & Hart LLP

(57) ABSTRACT

Methods, systems, and devices for wireless communication are described. A wireless communications system operating in millimeter wave (mmW) spectrum may utilize synchronization signals for beam tracking. A synchronization signal (e.g., primary synchronization signals (PSS), secondary synchronization signals (SSS), etc.), beam reference signal, and/or control signal may be designed to facilitate beam tracking. A synchronization signal structure based on a repeated sequence in the time domain may facilitate searching for different beams in a timely manner. In some cases, the repeated synchronization signal structure may be achieved by using a larger tone spacing, and hence having shorter symbol duration and repeating the short symbols in
(Continued)

the time domain. The repeated structure may be further used to encode additional information (e.g., facilitated by the resulting additional degrees of freedom). Additionally or alternatively, a synchronization signal (e.g., SSS) may be discrete Fourier transform (DFT) pre-coded to achieve better peak-to-average-power-ratio (PAPR).

26 Claims, 20 Drawing Sheets

(51) Int. Cl.
    *H04J 11/00*     (2006.01)
    *H04L 5/00*     (2006.01)
    *H04L 27/26*     (2006.01)

(52) U.S. Cl.
    CPC .......... *H04L 5/0023* (2013.01); *H04L 5/0048* (2013.01); *H04L 27/2613* (2013.01); *H04L 27/2636* (2013.01); *H04L 27/2655* (2013.01); *H04L 27/2692* (2013.01); *H04W 56/0015* (2013.01); *H04L 5/0032* (2013.01)

(56) References Cited

U.S. PATENT DOCUMENTS

| | | | |
|---|---|---|---|
| 2009/0262710 A1* | 10/2009 | Doi | H04W 56/001 370/336 |
| 2014/0341050 A1 | 11/2014 | Luo et al. | |
| 2015/0016337 A1 | 1/2015 | Chung et al. | |
| 2015/0103870 A1* | 4/2015 | Kim | H04J 13/0062 375/135 |
| 2015/0237178 A1* | 8/2015 | Zhang | H04L 69/22 370/328 |
| 2016/0087765 A1* | 3/2016 | Guey | H04L 27/2607 370/330 |
| 2016/0100373 A1 | 4/2016 | Chen | |
| 2016/0192400 A1* | 6/2016 | Sohn | H04W 74/0833 370/252 |
| 2017/0078998 A1* | 3/2017 | Li | H04W 56/00 |
| 2017/0181134 A1* | 6/2017 | Niu | H04B 17/318 |

OTHER PUBLICATIONS

ISA/EP, International Search Report and Written Opinion of the International Searching Authority, Int'l Application No. PCT/US2017/032638, dated Nov. 21, 2017, European Patent Office, Rijswijk, NL, 21 pgs.

ISA/EPO, Partial International Search Report of the International Searching Authority, Int'l App. No. PCT/US2017/032638, dated Aug. 16, 2017, European Patent Office, Rijswijk, NL, 13 pgs.

* cited by examiner

OPTIMIZED SECONDARY SYNCHRONIZATION SIGNAL

CROSS REFERENCES

The present application for patent claims priority to U.S. Provisional Patent Application No. 62/344,384 by Abedini, et al., entitled "Optimized Secondary Synchronization Signal," filed Jun. 1, 2016, assigned to the assignee hereof.

BACKGROUND

The following relates generally to wireless communication, and more specifically to optimized secondary synchronization signal.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Wireless communications systems operating in millimeter wave (mmW) spectrum may employ beamforming. Synchronization signals (e.g., primary synchronization signals (PSS), secondary synchronization signals (SSS), etc.), beam reference signals, and/or control signals may be transmitted multiple times in different directions (e.g., each transmission may be beamformed differently). Communicating using a suboptimal beam direction (e.g., antenna array configuration) may result in decreased decoding efficiency and overall system performance.

SUMMARY

A wireless communications system operating in millimeter wave (mmW) spectrum may utilize synchronization (sync) signals or channels for beam tracking (e.g., finding the best beam pair between a transmitter and receiver). That is, a synchronization signal (e.g., primary synchronization signals (PSS), secondary synchronization signals (SSS), etc.), beam reference signal, and/or control signal may be designed to facilitate beam tracking. For example, a synchronization signal structure based on a repeated sequence in the time domain may facilitate searching for different beams in a timely manner. In some cases, the repeated synchronization signal structure may be achieved by using spacing between a subset of tones or by using a larger tone spacing, and hence having shorter symbol duration and repeating the short symbols in the time domain. The repeated structure may be further used to encode additional information (e.g., facilitated by the resulting additional degrees of freedom). Additionally or alternatively, a synchronization signal (e.g., SSS) may be discrete Fourier transform (DFT) pre-coded to achieve better peak-to-average-power-ratio (PAPR).

A method of wireless communication is described. The method may include receiving a synchronization signal, identifying a plurality of time domain repetitions of a sequence within the synchronization signal, and identifying a preferred beam direction for communicating with the base station based at least in part on the plurality of repetitions of the sequence.

An apparatus for wireless communication is described. The apparatus may include means for receiving a synchronization signal, means for identifying a plurality of time domain repetitions of a sequence within the synchronization signal, and means for identifying a preferred beam direction for communicating with the base station based at least in part on the plurality of repetitions of the sequence.

Another apparatus for wireless communication is described. The apparatus may include a processor, memory in electronic communication with the processor, and instructions stored in the memory. The instructions may be operable to cause the processor to receive a synchronization signal, identify a plurality of time domain repetitions of a sequence within the synchronization signal, and identify a preferred beam direction for communicating with the base station based at least in part on the plurality of repetitions of the sequence.

A non-transitory computer readable medium for wireless communication is described. The non-transitory computer-readable medium may include instructions operable to cause a processor to receive a synchronization signal, identify a plurality of time domain repetitions of a sequence within the synchronization signal, and identify a preferred beam direction for communicating with the base station based at least in part on the plurality of repetitions of the sequence.

Some examples of the method, apparatus, and non-transitory computer-readable medium described above may further include processes, features, means, or instructions for identifying a plurality of tones for receiving the synchronization signal, wherein the synchronization signal may be received using a subset of the plurality of tones and comprises a single symbol that includes the plurality of time domain repetitions of the sequence.

Some examples of the method, apparatus, and non-transitory computer-readable medium described above may further include processes, features, means, or instructions for identifying one or more bits of information based at least in part on the subset of the plurality tones.

Some examples of the method, apparatus, and non-transitory computer-readable medium described above may further include processes, features, means, or instructions for identifying the subset of the plurality of tones based at least in part on an identifier of an additional synchronization signal of the directional transmission.

In some examples of the method, apparatus, and non-transitory computer-readable medium described above, the subset of the plurality of tones comprises a subset of equidistant tones separated by a subset of empty tones that may be not used to transmit any signal. In some examples of the method, apparatus, and non-transitory computer-readable medium described above, the synchronization signal comprises a tone spacing that may be greater than a tone spacing of an additional signal of a transmission and a symbol duration that may be less than a symbol duration of an additional signal.

In some examples of the method, apparatus, and non-transitory computer-readable medium described above, the synchronization signal comprises a plurality of symbols, wherein each of the plurality of symbols comprises a time domain repetition of the sequence. In some examples of the method, apparatus, and non-transitory computer-readable medium described above, each of the plurality of symbols may be received using a frequency shift that may be different from a frequency shift for at least one symbol of the plurality of symbols.

Some examples of the method, apparatus, and non-transitory computer-readable medium described above may further include processes, features, means, or instructions for identifying the frequency shift for each of the plurality of symbols based at least in part on an identifier of the additional signal. Some examples of the method, apparatus, and non-transitory computer-readable medium described above may further include processes, features, means, or instructions for identifying a cover code for the plurality of symbols of the synchronization signal. Some examples of the method, apparatus, and non-transitory computer-readable medium described above may further include processes, features, means, or instructions for performing a correlation procedure on the synchronization signal based at least in part on the cover code.

In some examples of the method, apparatus, and non-transitory computer-readable medium described above, the cover code may be identified based at least in part on an identifier of a previous synchronization signal. Some examples of the method, apparatus, and non-transitory computer-readable medium described above may further include processes, features, means, or instructions for identifying a cover code for the plurality of symbols of the synchronization signal based at least in part on a correlation procedure. Some examples of the method, apparatus, and non-transitory computer-readable medium described above may further include processes, features, means, or instructions for identifying one or more bits of information based at least in part on the cover code.

In some examples of the method, apparatus, and non-transitory computer-readable medium described above, the synchronization signal may be received in a directional transmission. In some examples of the method, apparatus, and non-transitory computer-readable medium described above, the directional transmission comprises a millimeter wave (mmW) transmission. In some examples of the method, apparatus, and non-transitory computer-readable medium described above, the synchronization signal comprises a secondary synchronization signal (SSS).

A method of wireless communication is described. The method may include receiving a synchronization signal, performing a discrete Fourier transform (DFT) on the synchronization signal, performing an inverse discrete Fourier transform (IDFT) on an output of the DFT, and tuning a radio based at least in part on the output of the IDFT.

An apparatus for wireless communication is described. The apparatus may include means for receiving a synchronization signal, means for performing a discrete Fourier transform (DFT) on the synchronization signal, means for performing an inverse discrete Fourier transform (IDFT) on an output of the DFT, and means for tuning a radio based at least in part on the output of the IDFT.

Another apparatus for wireless communication is described. The apparatus may include a processor, memory in electronic communication with the processor, and instructions stored in the memory. The instructions may be operable to cause the processor to receive a synchronization signal, perform a discrete Fourier transform (DFT) on the synchronization signal, perform an inverse discrete Fourier transform (IDFT) on an output of the DFT, and tune a radio based at least in part on the output of the IDFT.

A non-transitory computer readable medium for wireless communication is described. The non-transitory computer-readable medium may include instructions operable to cause a processor to receive a synchronization signal, perform a discrete Fourier transform (DFT) on the synchronization signal, perform an inverse discrete Fourier transform (IDFT) on an output of the DFT, and tune a radio based at least in part on the output of the IDFT.

Some examples of the method, apparatus, and non-transitory computer-readable medium described above may further include processes, features, means, or instructions for performing a subcarrier demapping on the output of the DFT, wherein performing the IDFT on the output of the DFT comprises performing the IDFT on an output of the subcarrier demapping. In some examples of the method, apparatus, and non-transitory computer-readable medium described above, the DFT comprises a fast Fourier transform (FFT) or the IDFT comprises an inverse fast Fourier transform (IFFT).

Some examples of the method, apparatus, and non-transitory computer-readable medium described above may further include processes, features, means, or instructions for identifying one or more expansion tone samples of the synchronization signal, wherein the IFFT may be based at least in part on the one or more expansion tone samples. In some examples of the method, apparatus, and non-transitory computer-readable medium described above, the one or more expansion tone samples comprise one or more cyclic expansion tone samples. In some examples of the method, apparatus, and non-transitory computer-readable medium described above, the synchronization signal comprises a secondary synchronization signal (SSS).

In some examples of the method, apparatus, and non-transitory computer-readable medium described above, the synchronization signal may be received in a directional transmission. In some examples of the method, apparatus, and non-transitory computer-readable medium described above, the directional transmission comprises a millimeter wave (mmW) transmission.

A method of wireless communication is described. The method may include generating a synchronization signal, wherein the synchronization signal includes a plurality of time domain repetitions of a sequence and transmitting the synchronization signal to a user equipment (UE).

An apparatus for wireless communication is described. The apparatus may include means for generating a synchronization signal, wherein the synchronization signal includes a plurality of time domain repetitions of a sequence and means for transmitting the synchronization signal to a user equipment (UE).

Another apparatus for wireless communication is described. The apparatus may include a processor, memory in electronic communication with the processor, and instructions stored in the memory. The instructions may be operable to cause the processor to generate a synchronization signal, wherein the synchronization signal includes a plurality of time domain repetitions of a sequence and transmit the synchronization signal to a user equipment (UE).

A non-transitory computer readable medium for wireless communication is described. The non-transitory computer-readable medium may include instructions operable to cause a processor to generate a synchronization signal, wherein the synchronization signal includes a plurality of time domain repetitions of a sequence and transmit the synchronization signal to a user equipment (UE).

In some examples of the method, apparatus, and non-transitory computer-readable medium described above, the synchronization signal comprises a single symbol comprising the plurality of time domain repetitions of the sequence. Some examples of the method, apparatus, and non-transitory computer-readable medium described above may further include processes, features, means, or instructions for identifying a plurality of tones for transmitting the synchronization signal. Some examples of the method, apparatus, and non-transitory computer-readable medium described above may further include processes, features, means, or instructions for identifying one or more information bits.

Some examples of the method, apparatus, and non-transitory computer-readable medium described above may further include processes, features, means, or instructions for selecting a subset of the plurality of tones based at least in part on the one or more information bits, wherein the synchronization signal may be transmitted using the subset of the plurality of tones. In some examples of the method, apparatus, and non-transitory computer-readable medium described above, the subset of the plurality of tones comprises a subset of equidistant tones separated by a subset of empty tones that may be not used to transmit any signal.

In some examples of the method, apparatus, and non-transitory computer-readable medium described above, the synchronization signal comprises a tone spacing that may be greater than a tone spacing of an additional signal of a transmission and a symbol duration that may be less than a symbol duration of an additional signal. In some examples of the method, apparatus, and non-transitory computer-readable medium described above, the synchronization signal comprises a plurality of symbols, wherein each of the plurality of symbols comprises a time domain repetition of the sequence.

In some examples of the method, apparatus, and non-transitory computer-readable medium described above, each of the plurality of symbols may be transmitted using a frequency shift that may be different from a frequency shift for at least one symbol of the plurality of symbols. Some examples of the method, apparatus, and non-transitory computer-readable medium described above may further include processes, features, means, or instructions for identifying the frequency shift for each of the plurality of symbols based at least in part on an identifier of the additional synchronization signal.

Some examples of the method, apparatus, and non-transitory computer-readable medium described above may further include processes, features, means, or instructions for selecting a cover code for the plurality of symbols of the synchronization signal, wherein the synchronization signal may be transmitted based at least in part on the cover code. Some examples of the method, apparatus, and non-transitory computer-readable medium described above may further include processes, features, means, or instructions for identifying one or more information bits for the UE, wherein the cover code may be selected based at least in part on the one or more information bits.

In some examples of the method, apparatus, and non-transitory computer-readable medium described above, the synchronization signal is transmitted in a directional transmission. In some examples of the method, apparatus, and non-transitory computer-readable medium described above, the directional transmission comprises a millimeter wave (mmW) transmission. In some examples of the method, apparatus, and non-transitory computer-readable medium described above, the synchronization signal comprises a secondary synchronization signal (SSS).

A method of wireless communication is described. The method may include generating a synchronization signal, performing a discrete Fourier transform (DFT) precoding on the synchronization signal, performing an inverse discrete Fourier transform (IDFT) on an output of the DFT precoding, and transmitting an output of the IDFT to a user equipment (UE).

An apparatus for wireless communication is described. The apparatus may include means for generating a synchronization signal, means for performing a discrete Fourier transform (DFT) precoding on the synchronization signal, means for performing an inverse discrete Fourier transform (IDFT) on an output of the DFT precoding, and means for transmitting an output of the IDFT to a user equipment (UE).

Another apparatus for wireless communication is described. The apparatus may include a processor, memory in electronic communication with the processor, and instructions stored in the memory. The instructions may be operable to cause the processor to generate a synchronization signal, perform a discrete Fourier transform (DFT) precoding on the synchronization signal, perform an inverse discrete Fourier transform (IDFT) on an output of the DFT precoding, and transmit an output of the IDFT to a user equipment (UE).

A non-transitory computer readable medium for wireless communication is described. The non-transitory computer-readable medium may include instructions operable to cause a processor to generate a synchronization signal, perform a discrete Fourier transform (DFT) precoding on the synchronization signal, perform an inverse discrete Fourier transform (IDFT) on an output of the DFT precoding, and transmit an output of the IDFT to a user equipment (UE).

Some examples of the method, apparatus, and non-transitory computer-readable medium described above may further include processes, features, means, or instructions for performing a subcarrier mapping on the output of the DFT precoding, wherein performing the IDFT on the output of the DFT precoding comprises performing the IDFT on an output of the subcarrier mapping. In some examples of the method, apparatus, and non-transitory computer-readable medium described above, the DFT precoding comprises a fast Fourier transform (FFT) precoding or the IDFT comprises an inverse fast Fourier transform (IFFT).

Some examples of the method, apparatus, and non-transitory computer-readable medium described above may further include processes, features, means, or instructions for appending one or more expansion tone samples to the synchronization signal, wherein the FFT precoding or the IDFT may be based at least in part on the one or more expansion tone samples. In some examples of the method, apparatus, and non-transitory computer-readable medium described above, the one or more expansion tone samples comprise one or more cyclic expansion tone samples.

In some examples of the method, apparatus, and non-transitory computer-readable medium described above, the synchronization signal is transmitted in a directional transmission. In some examples of the method, apparatus, and non-transitory computer-readable medium described above, the directional transmission comprises a millimeter wave (mmW) transmission. In some examples of the method, apparatus, and non-transitory computer-readable medium described above, the synchronization signal comprises a secondary synchronization signal (SSS).

DETAILED DESCRIPTION

A wireless communications system operating in millimeter wave (mmW) spectrum may utilize synchronization (sync) signals or channels for beam tracking (e.g., finding the best beam pair between a transmitter and receiver). That is, a synchronization signal (e.g., primary synchronization signals (PSS), secondary synchronization signals (SSS), etc.), beam reference signal, and/or control signal may be designed to facilitate beam tracking. For example, a synchronization signal structure based on a repeated sequence in the time domain may facilitate searching for different beams in a timely manner.

In some cases, the repeated synchronization signal structure may be achieved by using spacing between a subset of tones or by using a larger tone spacing, and hence having shorter symbol duration and repeating the short symbols in the time domain. Having a sequence based on repeated short symbols, while each symbol has a cyclic prefix (CP), may allow for more time between repeated synchronization signals in the time domain. That is, repeating short symbols, with a larger tone spacing may allow more time for the receiving device to switch beams between consecutive synchronization signal symbols. The repeated structure may be further used to encode additional information (e.g., facilitated by the resulting additional degrees of freedom). Additionally or alternatively, a synchronization signal (e.g., SSS) may be discrete Fourier transform (DFT) pre-coded to achieve better peak-to-average-power-ratio (PAPR).

Aspects of the disclosure are initially described in the context of a wireless communications system. Examples of wireless systems supporting optimized secondary synchronization signals, in addition to configurations of optimized secondary synchronization signals are then described. Aspects of the disclosure are further illustrated by and described with reference to apparatus diagrams, system diagrams, and flowcharts that relate to optimized secondary synchronization signal.

Figure 1:
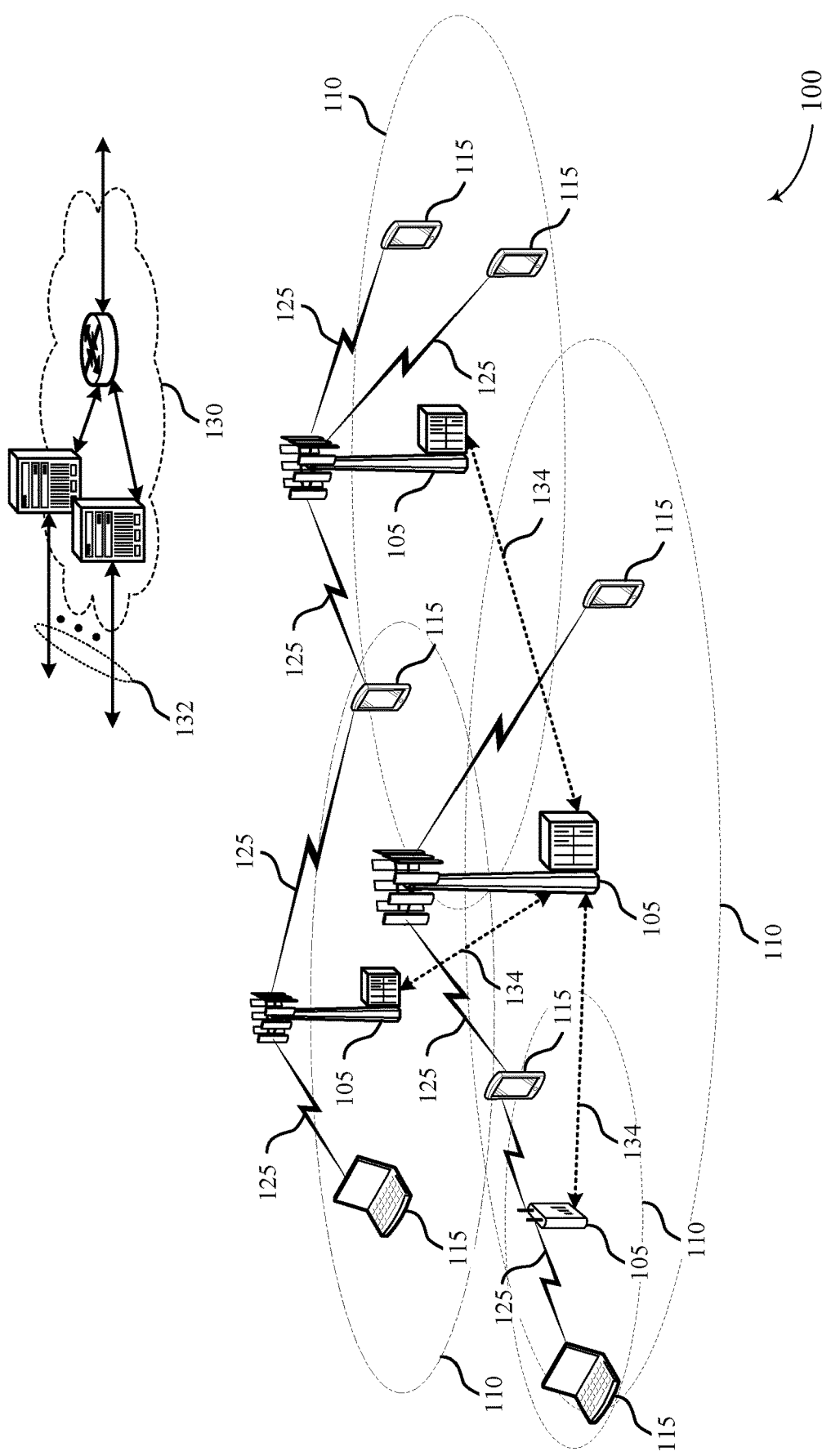
FIG. 1 illustrates an example of a system for wireless communication that supports optimized secondary synchronization signal in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network.

Wireless communications system 100 may operate in an ultra high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may support millimeter wave (mmW) communications between UEs 115 and base stations 105. mmW devices (e.g., UEs 115 and base station 105) may have multiple antennas to allow beamforming. That is, a base station 105 may use multiple antennas or antenna arrays to conduct beamforming operations for directional communications with a UE 115. Beamforming (which may also be referred to as spatial filtering) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference. Multiple-input multiple-output (MIMO) wireless systems use a transmission scheme between a transmitter (e.g. a base station) and a receiver (e.g. a UE), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115.

Synchronization (e.g., cell acquisition) may be performed using synchronization signals or channels transmitted by a synchronization source (e.g., a base station 105). Synchronization signals may include primary synchronization signal (PSS), secondary source signal (SSS), physical broadcast channel (PBCH), etc. A UE 115 attempting to access a wireless network may perform an initial cell search by detecting a PSS from a base station 105. The PSS may enable synchronization of slot timing and may indicate a physical layer identity value. The PSS may be utilized to acquire timing and frequency portions of a cell identification (e.g., PCID). The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. A SSS may be used to acquire the full PCID and other system information (e.g., subframe index). The PBCH may be used to acquire additional system information needed for acquisition (e.g., bandwidth, frame index, etc.). After receiving the PSS and SSS, the UE 115 may receive a MIB, which may be transmitted in a downlink physical channel for broadcast information (e.g., a physical broadcast channel (PBCH)). The MIB may contain system bandwidth information, an SFN, and a PHICH configuration. After decoding the MIB, the UE 115 may receive one or more SIBs.

Synchronization signals (e.g., PSS, SSS, etc.) may be transmitted multiple times in different directions (e.g., each transmission may be beamformed differently). A mmW receiver (e.g., a UE 115) may try multiple beams (e.g., antenna subarrays) while receiving the synchronization signals.

Elements of wireless communications system 100 (e.g., UE 115 and base station 105) may utilize digital signal processors (DSPs) implementing Fourier transforms. A discrete Fourier transform (DFT) may transform discrete time data sets into a discrete frequency representation. The discrete frequency representation may be used to map information to subcarriers in the frequency domain. Further, an inverse discrete Fourier transform (IDFT) may be used to transform a discrete frequency representation (e.g., information represented in subcarriers) into a discrete time representation (e.g., a signal carrying information in the time domain). For example, a transmitter may perform a DFT to map information to subcarriers, and subsequently perform an IDFT to transform the information contained in subcarriers into a signal varying in time to convey the original information.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an MTC device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, the antennas of a base station 105 or UE 115 may be located within one or more antenna arrays. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

A UE 115 attempting to access a wireless network may perform an initial cell search by detecting a PSS from a base station 105. The PSS may enable synchronization of slot timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. After receiving the PSS and SSS, the UE 115 may receive a MIB, which may be transmitted in the PBCH. The MIB may contain system bandwidth information, an SFN, and a PHICH configuration. After decoding the MIB, the UE 115 may receive one or more SIBs. For example, SIB1 may contain cell access parameters and scheduling information for other SIBs. Decoding SIB1 may enable the UE 115 to receive SIB2. SIB2 may contain RRC configuration information related to RACH procedures, paging, PUCCH, PUSCH, power control, SRS, and cell barring.

Figure 2:
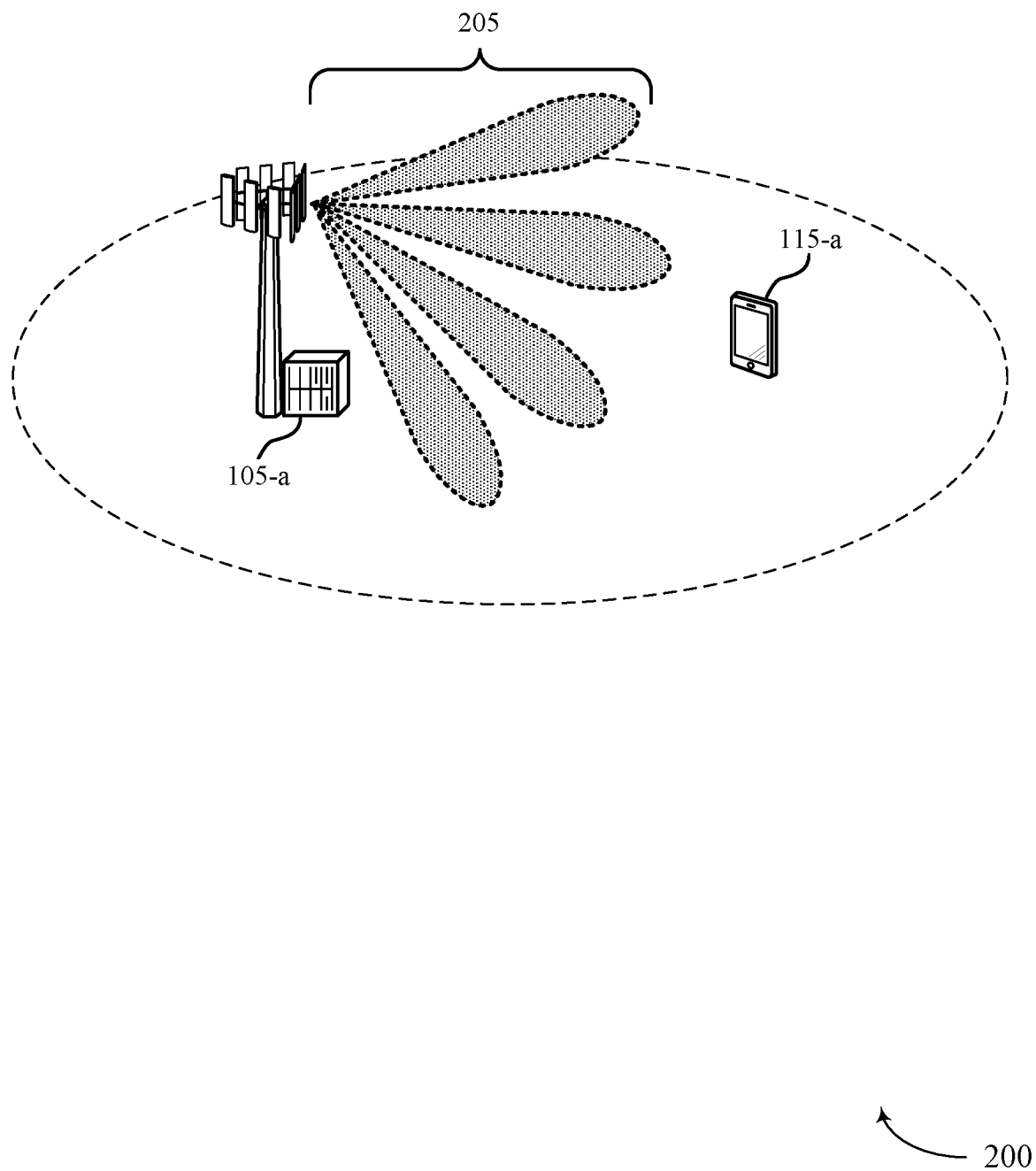
FIG. 2 illustrates an example of a system for wireless communication that supports optimized secondary synchronization signal in accordance with aspects of the present disclosure.

FIG. 2 illustrates an example of a wireless communications system 200 supporting optimized secondary synchronization signals. In some cases, wireless communications system 200 may represent aspects of techniques performed by a UE 115 or base station 105 as described with reference to FIG. 1.

Wireless communications system 200 (e.g., a mmW system) may utilize synchronization (sync) signals or channels for beam tracking (e.g., finding the best beam pair between a transmitter and receiver). That is, a synchronization signal (e.g., PSS, SSS, etc.) may be designed to facilitate beam tracking. For example, a repeated synchronization signal structure in the time domain may facilitate searching for different beams 205 (e.g., transmitted by base station 105-a) in a timely manner. In some cases, the repeated synchronization signal structure may be achieved by using spacing between a subset of tones or by using a larger tone spacing, and hence having shorter symbol duration and repeating short symbols in the time domain. The repeated structure may be further used to encode additional information (e.g., facilitated by the resulting additional degrees of freedom). Additionally or alternatively, a synchronization signal (e.g., SSS) may be DFT pre-coded to provide better PAPR.

A signal structure with tone separation in the frequency domain may be configured. That is, separating synchronization signal sample tones by null tones (e.g., empty tones or tones set to zero) may result in a signal with a repeated structure in the time domain. For example, in the frequency domain, synchronization signal samples may be mapped to a subset of tones that are K tones apart. That is, out of the available N tones, the synchronization signal may occupy N/K tones while the remaining (N−N/K) tones are set to zero (e.g., "0"). In the time domain, after IDFT, the synchronization signal symbol may consist of a waveform that is repeated K times.

Larger tone spacing in the frequency domain may result in a shorter symbol in the time domain that can be repeated to achieve a repeating synchronization signal structure in the time domain. That is, the synchronization signal may use larger tone spacing, and hence having shorter symbol duration, compared to other symbols. For example, the synchronization signal symbol duration may be reduced by a factor of K, if the tone spacing is increased by a factor of K. The resulting short synchronization signal symbol (e.g., with cyclic prefix (CP)) may be repeated K times. Tone spacing may be more widely expressed to having different tone spacings and symbol durations for various synchronization signals (e.g., PSS, SSS, etc.). The K consecutive synchronization signal symbols may each have a frequency shift $f_k$ for $k=0, \ldots, k-1$. For example, $\Delta f = k f_0$ where $f_k = K f_0$ is the tone spacing. For example, in equation (1) let $X(n)$, for $n=0, \ldots,$ $$\frac{N}{K} - 1,$$

denote the base synchronization signal sequence in time domain (e.g., without CP). The $e^{th}$ transmitted synchronization signal symbol will may be $$X_k(n) = X(n) e^{\frac{j2\pi n f_k}{N f_0}} \text{ for } n = 0, \ldots, \frac{N}{K} - 1 \quad (1)$$

The values for the frequency shifts $\{f_0, f_1, \ldots f_{K-1}\}$ may be determined based on the PSS.

The repeated synchronization signal structure may be used to encode information. The N available tones may be divided into K subsets each having N/K tones with K tone separation. log 2(K) bits of information may be encoded based on which of the K subsets are used to transmit synchronization signal. For example, tone indices of the $k^{th}$ set (for $k=0, \ldots, K-1$) may be $$\left\{ m = Kn + k: \text{ for } n = 0, 1, \ldots, \frac{N}{K} - 1 \right\}.$$

Additionally or alternatively, a K-length cover code may be applied to K short synchronization signal symbols in the time domain. For example, for K=4, one of four Hadamard codes of equation (2) may be applied.

$$\{[1,1,1,1],[1,-1,1,-1],[1,1,-1,-1],[1,-1,-1,1]\} \quad (2)$$

Letting $X_k$ denote the $k^{th}$ synchronization signal symbol in time domain without cover code, four possibilities may be: $[X_1, X_2, X_3, X_4]$, $[X_1, -X_2, X_3, -X_4]$, $[X_1, X_2, -X_3, -X_4]$, and $[X_1, -X_2, -X_3, X_4]$. These additional degrees of freedom may be used to encode part of the system information (e.g., symbol/frame number and/or cell id) for which the receiver (e.g., UE 115-a) may use for blind detection. Further, additional degrees of freedom may be used to improve reuse factor of synchronization signal and provide better orthogonalization among synchronization signal sequences. For example, the set of tones may be determined using the PSS identification (ID) (e.g., UE 115-a may not employ blind detection) or based on the cell ID.

Synchronization signal may be DFT pre-coded to reduce peak to average power ratio (PAPR). That is, a receiver (e.g., UE 115-a) may tune a radio based on the output of an IDFT of a DFT pre-coded synchronization signal. DFT and IDFT may be replaced by a fast Fourier transform (FFT) and inverse fast Fourier transform (IFFT) to allow for receiver algorithms of reduced complexity. The synchronization signal base sequence length may be selected to be a power of 2. The n-length synchronization signal base sequence may be expanded to the closest power of 2, for example, by cyclic expansion or by tone expansion (e.g., synchronization signal sequence of 62 tones expanded to 64 tones). The synchronization signal sequence length being a power of 2 may simplify receiver processing.

Figure 3:
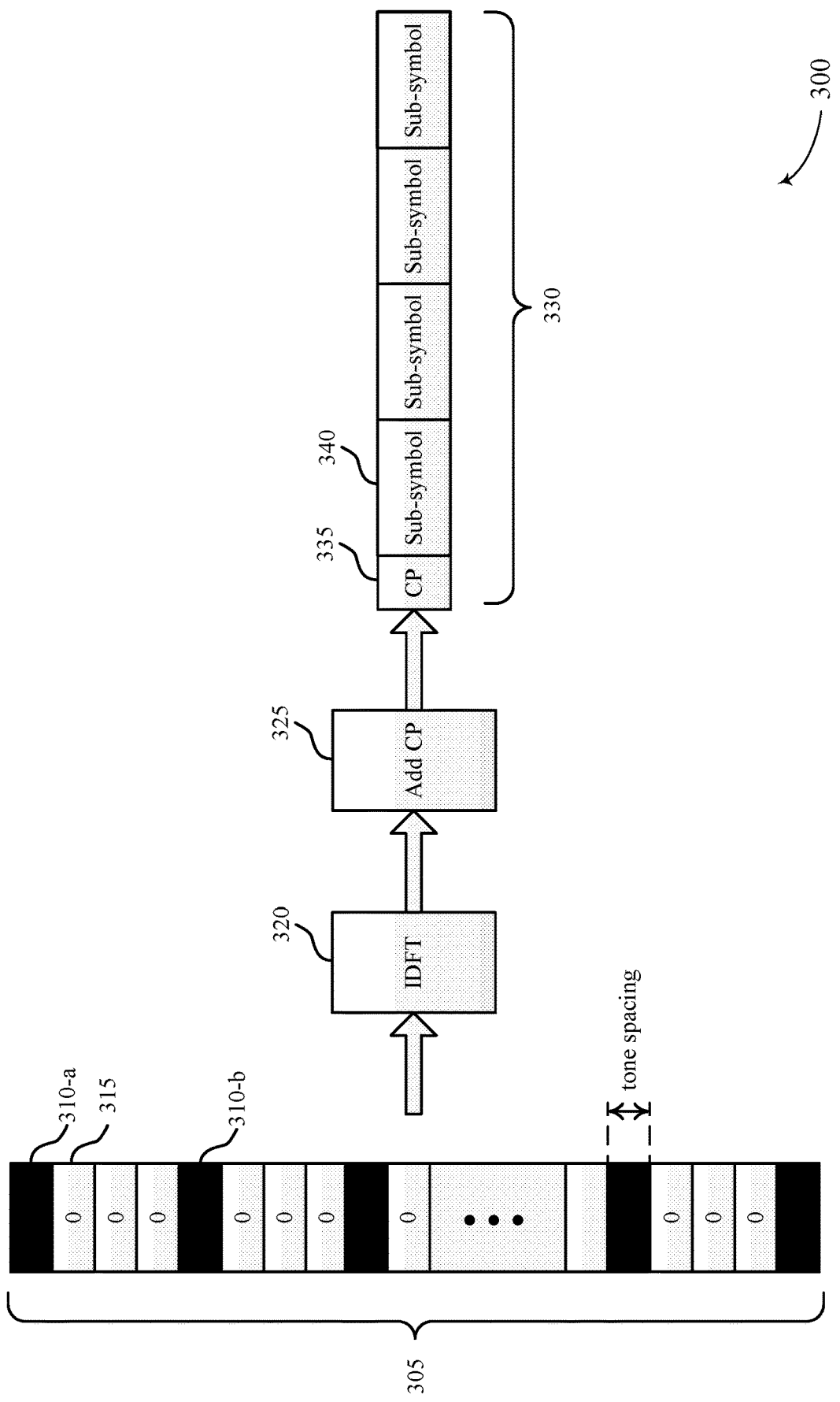
FIGS. 3 and 4 illustrate examples of a repeated synchronization signal sequence configuration that supports optimized secondary synchronization signal in accordance with aspects of the present disclosure.

FIG. 3 illustrates an example of a repeated synchronization signal sequence configuration 300 for optimized secondary synchronization signal. In some cases, repeated synchronization signal sequence configuration 300 may represent aspects of techniques performed by a UE 115 or base station 105 as described with reference to FIG. 1.

Frequency region 305 may include N tones in the frequency domain. Each of the N tones may be spaced by a distance $f_0$ from one another. Frequency region 305 may include synchronization signal sample tones 310 and null tones 315.

A synchronization signal sample tone 310 may be mapped to one out of every K tones, while the remaining tones are set to zero (e.g., set as null tones 315). In the example repeated synchronization signal sequence configuration 300, synchronization signal sample tones 310 are mapped to one out of every 4 tones (e.g., K=4) of the N tones. That is, synchronization signal sample tone 310-a is separated by three null tones 315 followed by synchronization signal sample tone 310-b.

An IDFT 320 may then be performed on the information contained in frequency region 305. A CP addition process 325 may then performed. Time region 330 (e.g., in the time domain) includes the resulting information following the IDFT 320 and CP addition process 325. That is, time region 330 includes a CP 335 followed by K (e.g., K=4) synchronization signal sub-symbols 340.

Figure 4:
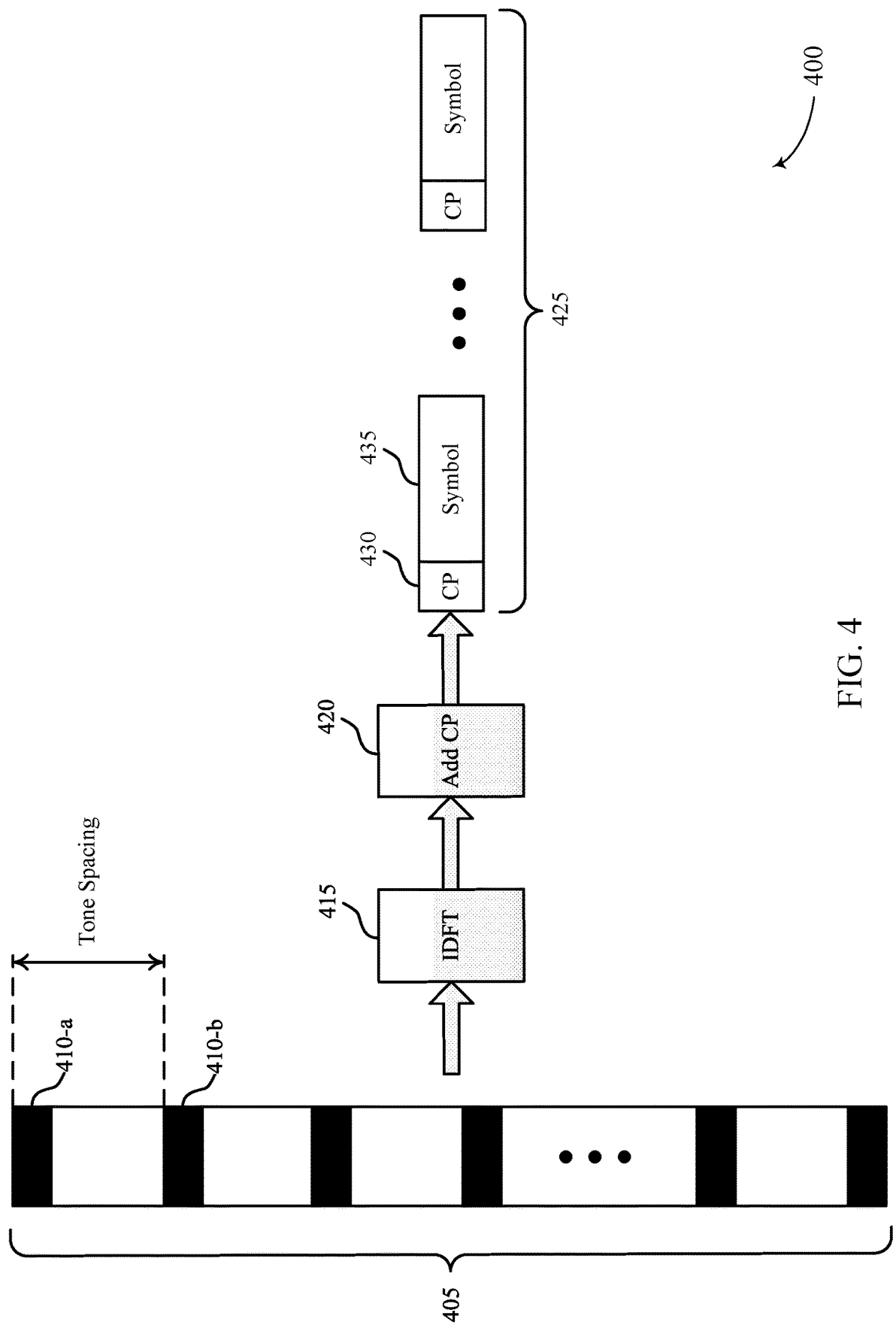

FIG. 4 illustrates an example of a repeated synchronization signal sequence configuration 400 for optimized secondary synchronization signal. In some cases, repeated synchronization signal sequence configuration 400 may represent aspects of techniques performed by a UE 115 or base station 105 as described with reference to FIG. 1.

Frequency region 405 may include N/K tones in the frequency domain. Each of the N/K tones may arise from a tone spacing of $Kf_0$ between each synchronization signal sample tone 410. For example, synchronization signal sample tone 410-a may be spaced a distance of $Kf_0$ from synchronization signal sample tone 410-b. That is, the N/K synchronization signal sample tones 410 may be spaced and expand the frequency region 405 (e.g., no null tones).

An IDFT 415 may then be performed on the information contained in frequency region 405. A CP addition process 420 may then performed. Time region 425 (e.g., in the time domain) includes the resulting information following the IDFT 415 and CP addition process 420. That is, time region 425 includes CP 430 and synchronization signal symbols 435.

Figure 5:
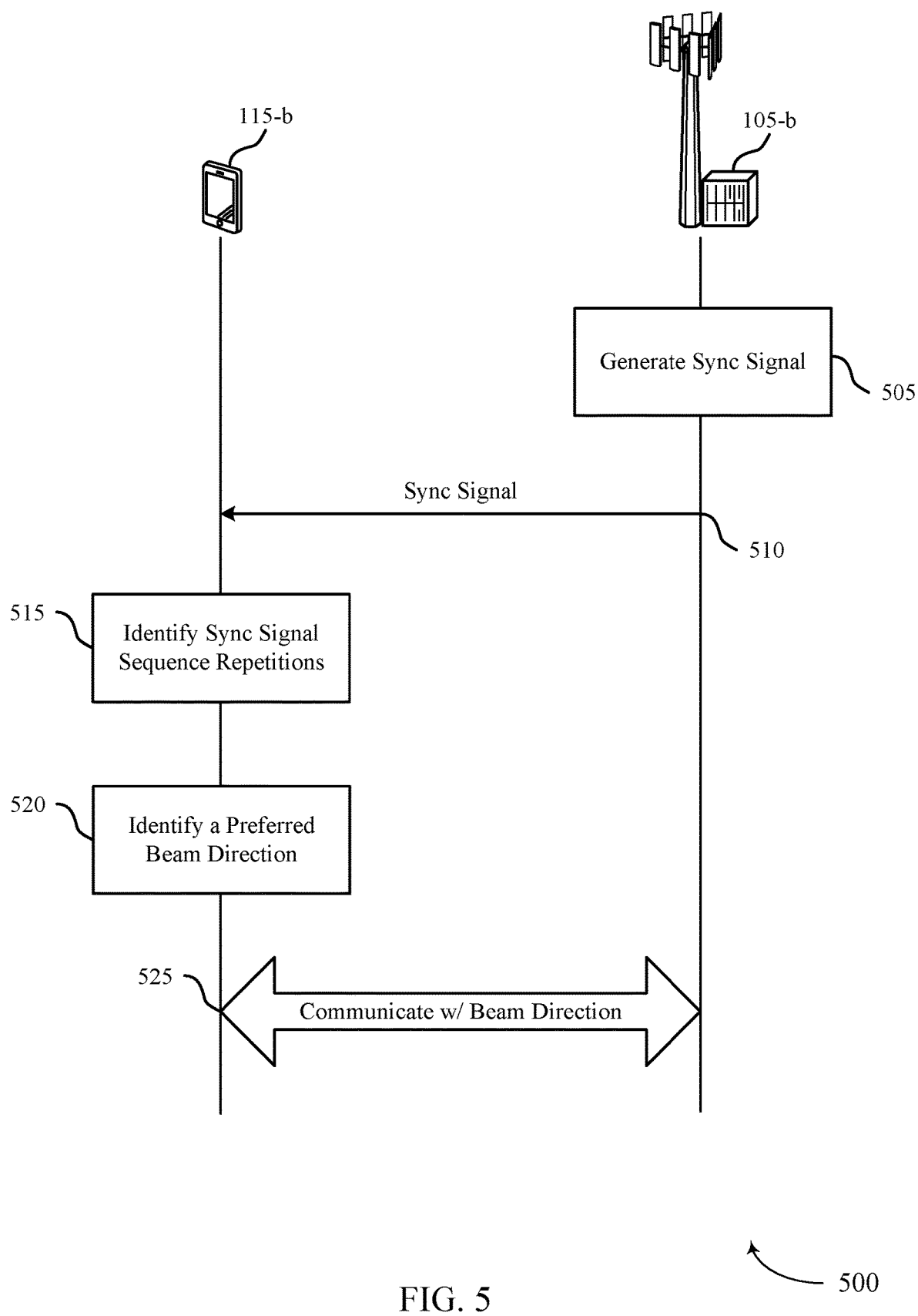
FIGS. 5 and 6 illustrate examples of a process flow that supports optimized secondary synchronization signal in accordance with aspects of the present disclosure.

FIG. 5 illustrates an example of a process flow 600 for optimized secondary synchronization signal. In some cases, process flow 600 may represent aspects of techniques performed by a UE 115 or base station 105 as described with reference to FIG. 1.

At step 505, base station 105-b may generate a synchronization signal (e.g., a SSS) that includes time domain repetitions of a sequence. The base station 105-b may further identify information bits, and select a set of tones for transmitting the synchronization signal based on the information bits. In some cases, tones may be identified based on an identifier of an additional synchronization signal of the directional transmission. The synchronization signal may include multiple symbols that are a time domain repetition of the sequence.

At step 510, base station 105-b may transmit the synchronization signal to UE 115-b. The synchronization signal may be transmitted using a directional transmission over mmW spectrum.

At step 515, UE 115-b may identify time domain repetitions of a sequence within the synchronization signal. UE 115-b may identify tones for receiving the synchronization signal and identify bits of information based on the tones. A frequency shift for each of the symbols may be identified based on the identifier of the additional synchronization signal. Further, a cover code may be identified for the symbols of the synchronization signal. A correlation procedure may be performed on the synchronization signal based on the cover code. Alternatively, a cover code may be identified based on a correlation procedure and information bits may be identified based on the cover code.

At step 520 UE 115-b may identify a preferred beam direction for communicating with base station 105-b. The preferred beam direction may be identified based on attempts to receive the repeated sequence using multiple beams or antenna subarrays. At step 525, UE 115-b may perform a random access channel (RACH) procedure and communicate with base station 105-b via the preferred beam direction identified in step 520.

Figure 6:
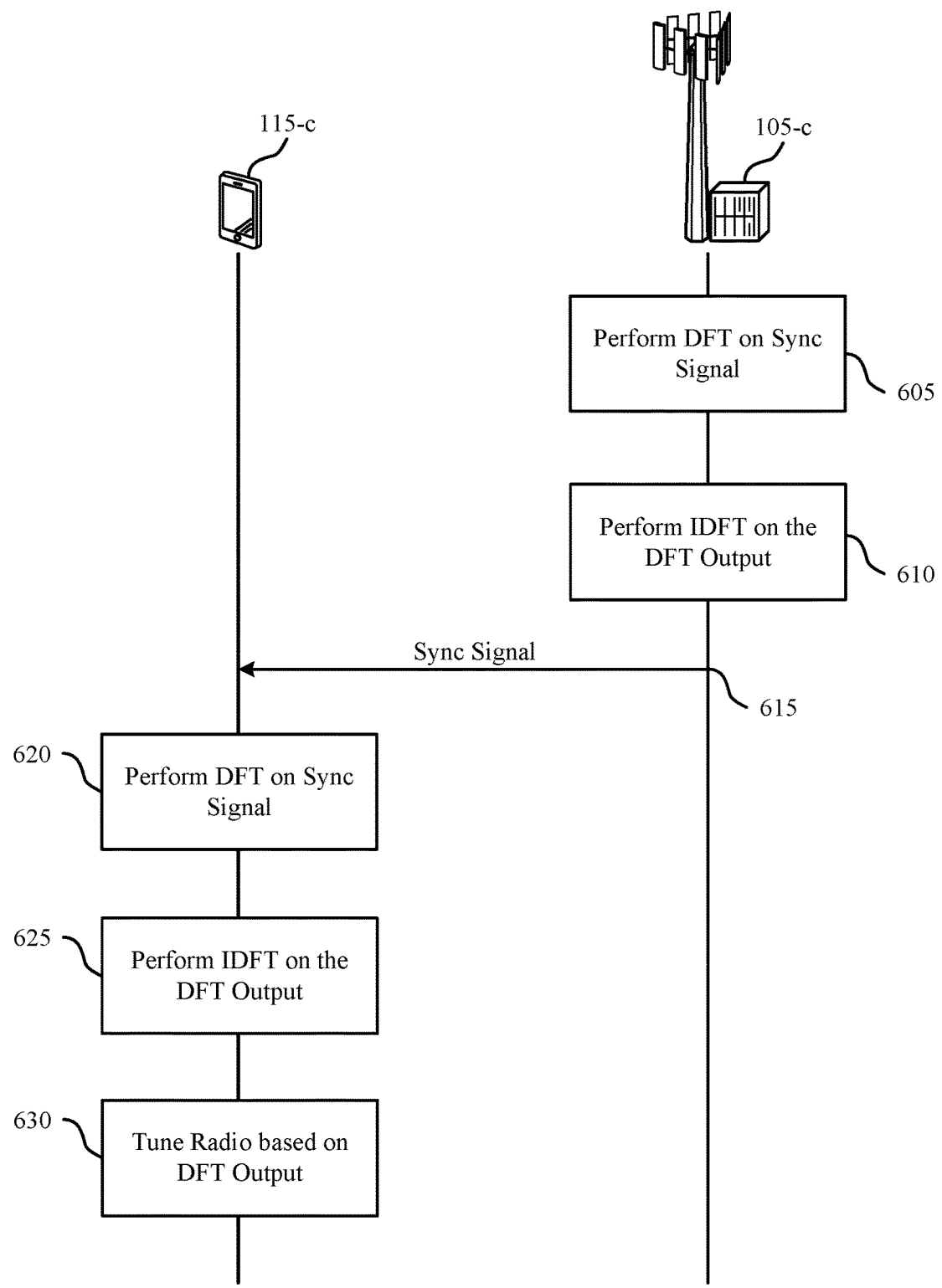

FIG. 6 illustrates an example of a process flow 600 for optimized secondary synchronization signal. In some cases, process flow 600 may represent aspects of techniques performed by a UE 115 or base station 105 as described with reference to FIG. 1.

At step 605, base station 105-c may perform a DFT precoding on a synchronization signal. That is, base station 105-c may map the output of the DFT precoding. In some cases, the DFT precoding may include a FFT precoding. At step 610, base station 105-c may perform an IDFT on the output of the DFT (e.g., the output of the subcarrier mapping) performed in step 605 to prepare a synchronization signal for transmission. In some cases, the IDFT may include an IFFT precoding.

At step 615, base station 105-c may transmit the output of the IDFT to UE 115-c. The output of the IDFT may be transmitted using a directional transmission over mmW spectrum. In some cases, the transmission may include cyclic expansion tone samples.

At step 620, UE 115-c may perform a DFT on the received synchronization signal. A subcarrier demapping on the output of the DFT may be performed. At step 625, UE 115-c may perform an IDFT on the output of the DFT performed at step 620. Performing an IDFT on the output of the DFT may include performing the IDFT on an output of the subcarrier demapping. At step 630, UE 115-c may tune a radio for communication with base station 105-c based on the output of the IDFT.

Figure 7:
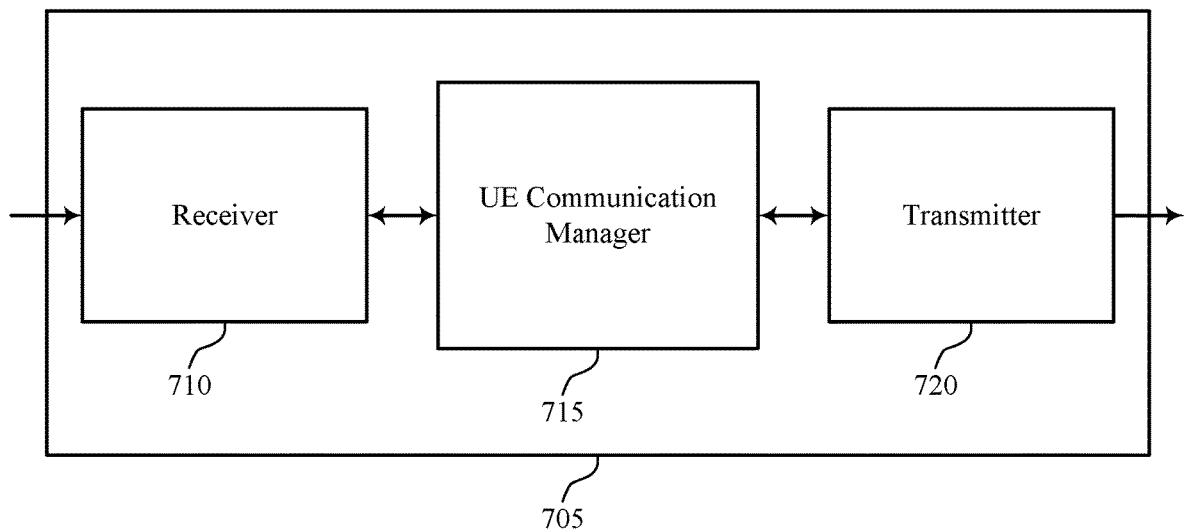
FIGS. 7 through 9 show block diagrams of a device that supports optimized secondary synchronization signal in accordance with aspects of the present disclosure.

FIG. 7 shows a block diagram 700 of a wireless device 705 that supports optimized secondary synchronization signal in accordance with various aspects of the present disclosure. Wireless device 705 may be an example of aspects of a UE 115 as described with reference to FIG. 1. Wireless device 705 may include receiver 710, UE communication manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to optimized secondary synchronization signal, etc.). Information may be passed on to other components of the device. The receiver 710 may be an example of aspects of the transceiver 1035 described with reference to FIG. 10.

Receiver 710 may receive a synchronization signal. In some cases, the synchronization signal is received in a directional transmission. In some cases, the directional transmission includes a millimeter wave (mmW) transmission. In some cases, the synchronization signal is a secondary synchronization signal (SSS).

UE communication manager 715 may be an example of aspects of the UE communication manager 1015 described with reference to FIG. 10. UE communication manager 715 may identify a set of time domain repetitions of a sequence within the synchronization signal, identify a preferred beam direction for communicating with the base station based on the set of repetitions of the sequence, perform a discrete Fourier transform (DFT) on the synchronization signal, perform an inverse discrete Fourier transform (IDFT) on an output of the DFT, and tune a radio based on the output of the IDFT.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or it may include a set of antennas.

Figure 8:
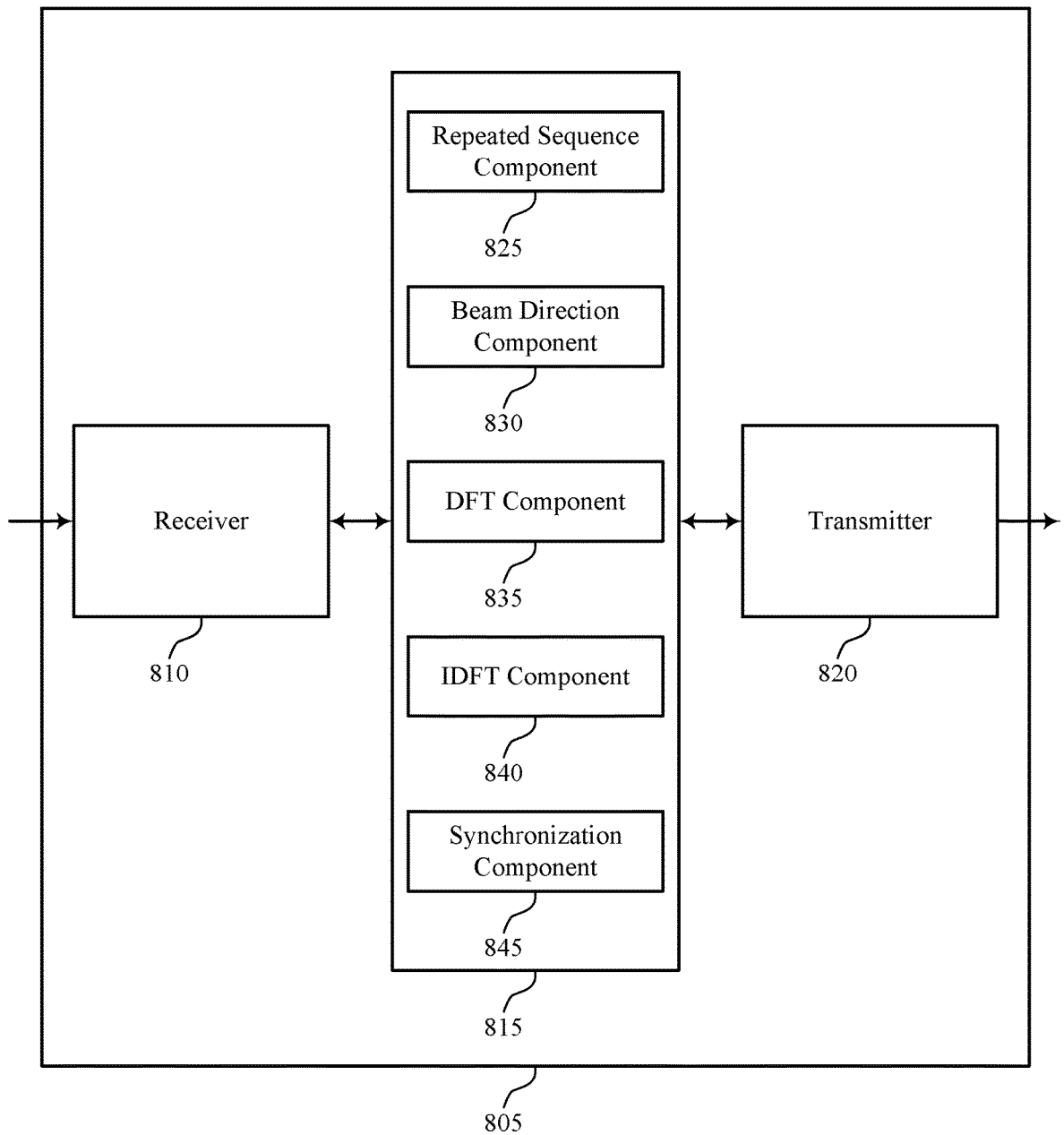

FIG. 8 shows a block diagram 800 of a Wireless device 805 that supports optimized secondary synchronization signal in accordance with various aspects of the present disclosure. Wireless device 805 may be an example of aspects of a wireless device 705 or a UE 115 as described with reference to FIGS. 1 and 7. Wireless device 805 may include receiver 810, UE communication manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to optimized secondary synchronization signal, etc.). Information may be passed on to other components of the device. The receiver 810 may be an example of aspects of the transceiver 1035 described with reference to FIG. 10.

UE communication manager 815 may be an example of aspects of the UE communication manager 1015 described with reference to FIG. 10. UE communication manager 815 may also include repeated sequence component 825, beam direction component 830, DFT component 835, IDFT component 840, and synchronization component 845.

Repeated sequence component 825 may identify a set of time domain repetitions of a sequence within the synchronization signal. In some cases, the synchronization signal includes a set of symbols, where each of the set of symbols includes a time domain repetition of the sequence.

Beam direction component 830 may identify a preferred beam direction for communicating with the base station based on the set of repetitions of the sequence. DFT component 835 may perform a discrete Fourier transform (DFT) on the synchronization signal.

IDFT component 840 may perform an inverse discrete Fourier transform (IDFT) on an output of the DFT and identify one or more expansion tone samples of the synchronization signal, where the IFFT is based on the one or more expansion tone samples. In some cases, the DFT includes a fast Fourier transform (FFT) or the IDFT includes an inverse fast Fourier transform (IFFT). In some cases, the one or more expansion tone samples include one or more cyclic expansion tone samples.

Synchronization component 845 may tune a radio based on the output of the IDFT.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Figure 9:
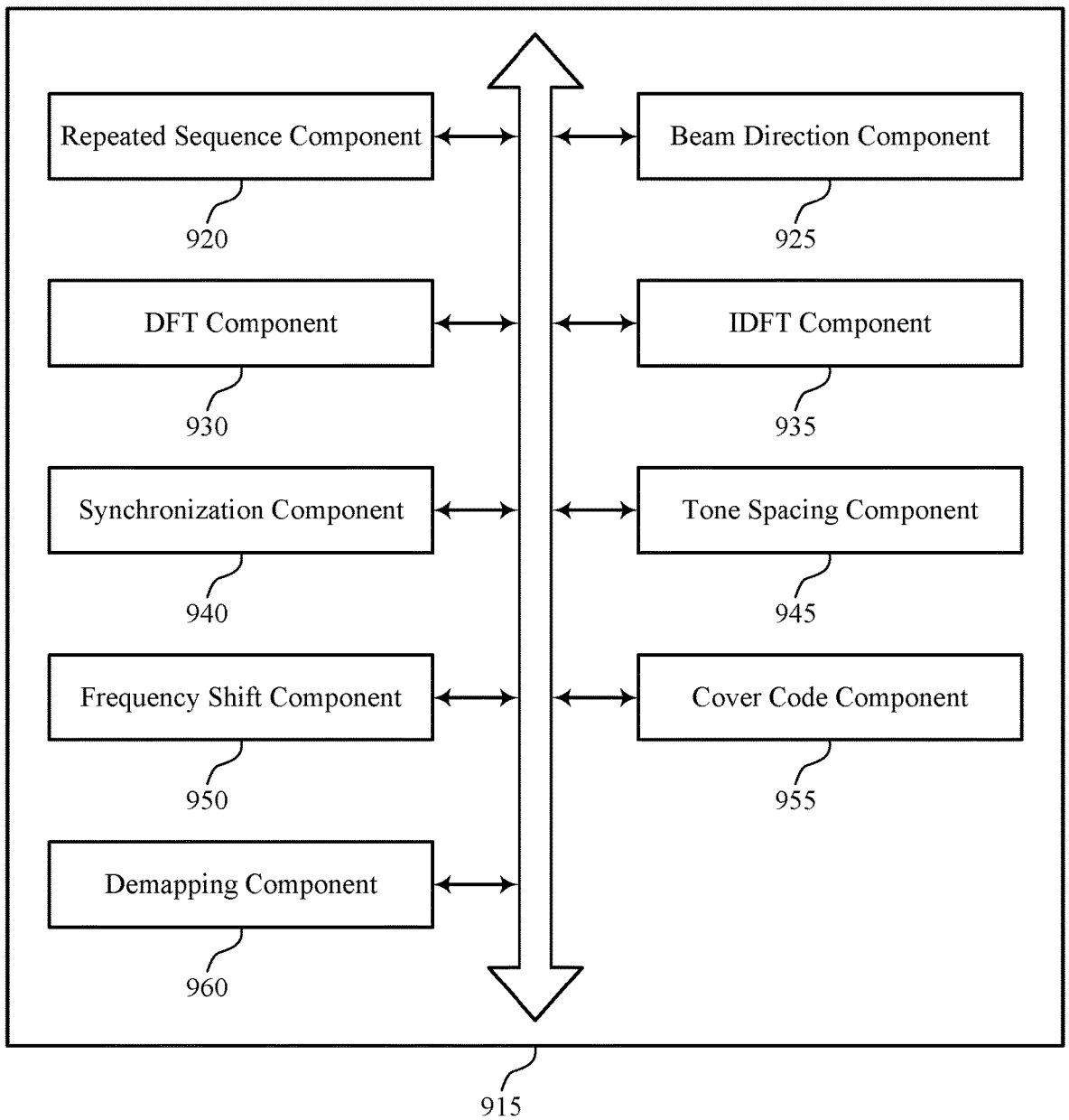

FIG. 9 shows a block diagram 900 of a UE communication manager 915 that supports optimized secondary synchronization signal in accordance with various aspects of the present disclosure. The UE communication manager 915 may be an example of aspects of a UE communication manager 715, a UE communication manager 815, or a UE communication manager 1015 described with reference to FIGS. 7, 8, and 10. The UE communication manager 915 may include repeated sequence component 920, beam direction component 925, DFT component 930, IDFT component 935, synchronization component 940, tone spacing component 945, frequency shift component 950, cover code component 955, and demapping component 960. Each of these modules may communicate, directly or indirectly, with one another (e.g., via one or more buses).

Repeated sequence component 920 may identify a set of time domain repetitions of a sequence within the synchronization signal. In some cases, the synchronization signal includes a set of symbols, where each of the set of symbols includes a time domain repetition of the sequence.

Beam direction component 925 may identify a preferred beam direction for communicating with the base station based on the set of repetitions of the sequence. DFT component 930 may perform a discrete Fourier transform (DFT) on the synchronization signal.

IDFT component 935 may perform an inverse discrete Fourier transform (IDFT) on an output of the DFT and identify one or more expansion tone samples of the synchronization signal, where the IFFT is based on the one or more expansion tone samples. In some cases, the DFT includes a fast Fourier transform (FFT) or the IDFT includes an inverse fast Fourier transform (IFFT). In some cases, the one or more expansion tone samples include one or more cyclic expansion tone samples.

Synchronization component 940 may tune a radio based on the output of the IDFT.

Tone spacing component 945 may identify a set of tones for receiving the synchronization signal, where the synchronization signal is received using a subset of the set of tones and includes a single symbol that includes the set of time domain repetitions of the sequence, identify one or more bits of information based on the subset of the set tones, and identify the subset of the set of tones based on an identifier of an additional synchronization signal of the directional transmission. In some cases, the subset of the set of tones includes a subset of equidistant tones separated by a subset of empty tones that are not used to transmit the synchronization signal. In some cases, the synchronization signal includes a tone spacing that is greater than a tone spacing of an additional signal of a transmission and a symbol duration that is less than a symbol duration of an additional signal.

Frequency shift component 950 may identify the frequency shift for each of the set of symbols based on an identifier of the additional signal. In some cases, each of the set of symbols is received using a frequency shift that is different from a frequency shift for at least one symbol of the set of symbols.

Cover code component 955 may identify a cover code for the set of symbols of the synchronization signal, perform a correlation procedure on the synchronization signal based on the cover code, identify a cover code for the set of symbols of the synchronization signal based on a correlation procedure, and identify one or more bits of information based on the cover code. In some cases, the cover code is identified based on an identifier of a previous synchronization signal.

Demapping component 960 may perform a subcarrier demapping on the output of the DFT, where performing the IDFT on the output of the DFT includes performing the IDFT on an output of the subcarrier demapping.

Figure 10:
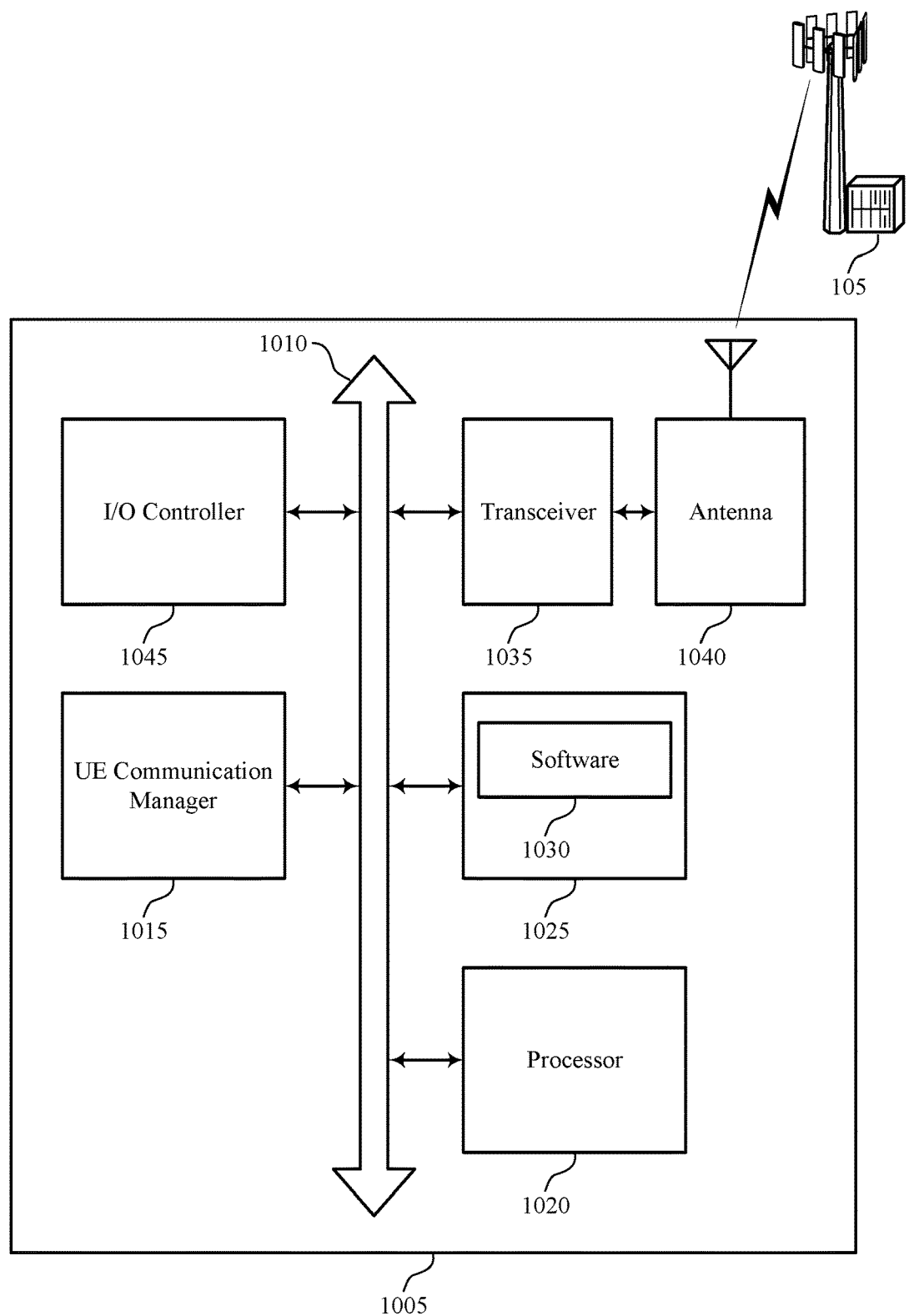
FIG. 10 illustrates a block diagram of a system including a UE that supports optimized secondary synchronization signal in accordance with aspects of the present disclosure.

FIG. 10 shows a diagram of a system 1000 including a device 1005 that supports optimized secondary synchronization signal in accordance with various aspects of the present disclosure. Device 1005 may be an example of or include the components of wireless device 705, wireless device 805, or a UE 115 as described above, e.g., with reference to FIGS. 1, 7 and 8.

Device 1005 may include components for bi-directional voice and data communications including components for transmitting and receiving communications, including UE communication manager 1015, processor 1020, memory 1025, software 1030, transceiver 1035, antenna 1040, and I/O controller 1045.

Processor 1020 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., function or tasks supporting optimized secondary synchronization signal). 1020.

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 can contain, among other things, a Basic Input-Output system (BIOS) which may control basic hardware and/or software operation such as the interaction with peripheral components or devices.

Software 1030 may include code to implement aspects of the present disclosure, including code to support optimized secondary synchronization signal. Software 1030 can be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. Input/output control component 1045 may also manage peripherals not integrated into device 1005. In some cases, input/output control component 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system.

Figure 11:
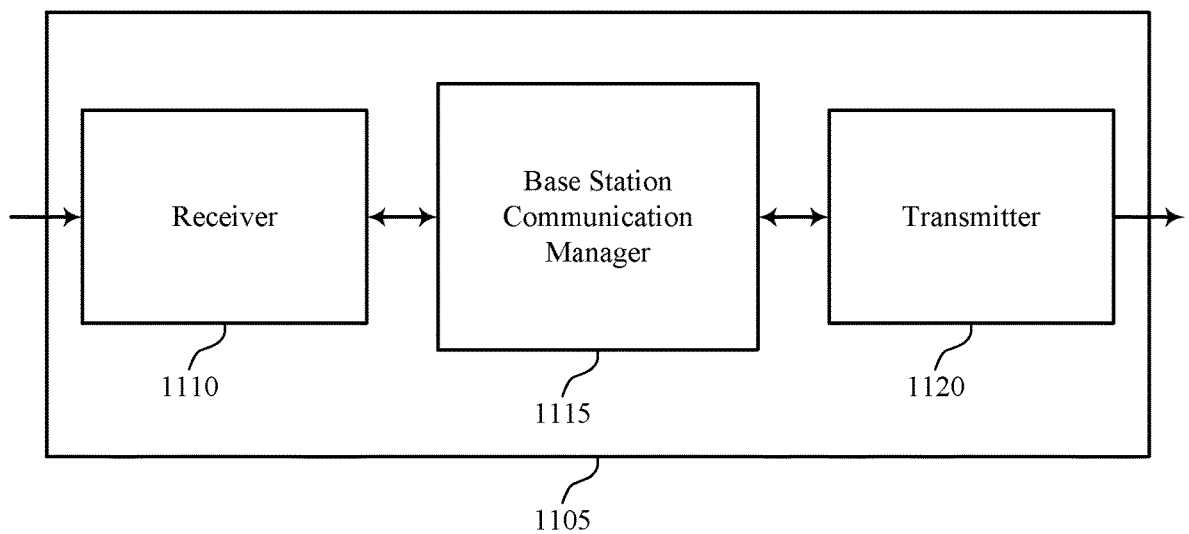
FIGS. 11 through 13 show block diagrams of a device that supports optimized secondary synchronization signal in accordance with aspects of the present disclosure.

FIG. 11 shows a block diagram 1100 of a wireless device 1105 that supports optimized secondary synchronization signal in accordance with various aspects of the present disclosure. Wireless device 1105 may be an example of aspects of a base station 105 as described with reference to FIG. 1. Wireless device 1105 may include receiver 1110, base station communication manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to optimized secondary synchronization signal, etc.). Information may be passed on to other components of the device. The receiver 1110 may be an example of aspects of the transceiver 1435 described with reference to FIG. 14.

Base station communication manager 1115 may be an example of aspects of the base station communication manager 1415 described with reference to FIG. 14. Base station communication manager 1115 may generate a synchronization signal, where the synchronization signal includes a set of time domain repetitions of a sequence, generate a synchronization signal, perform a discrete Fourier transform (DFT) precoding on the synchronization signal, and perform an inverse discrete Fourier transform (IDFT) on an output of the DFT precoding.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may include a single antenna, or it may include a set of antennas.

Transmitter 1120 may transmit the synchronization signal to a UE and transmit an output of the IDFT to a UE. In some cases, the synchronization signal is transmitted in a directional transmission. In some cases, the directional transmission includes a millimeter wave (mmW) transmission. In some cases, the synchronization signal is a secondary synchronization signal (SSS).

Figure 12:
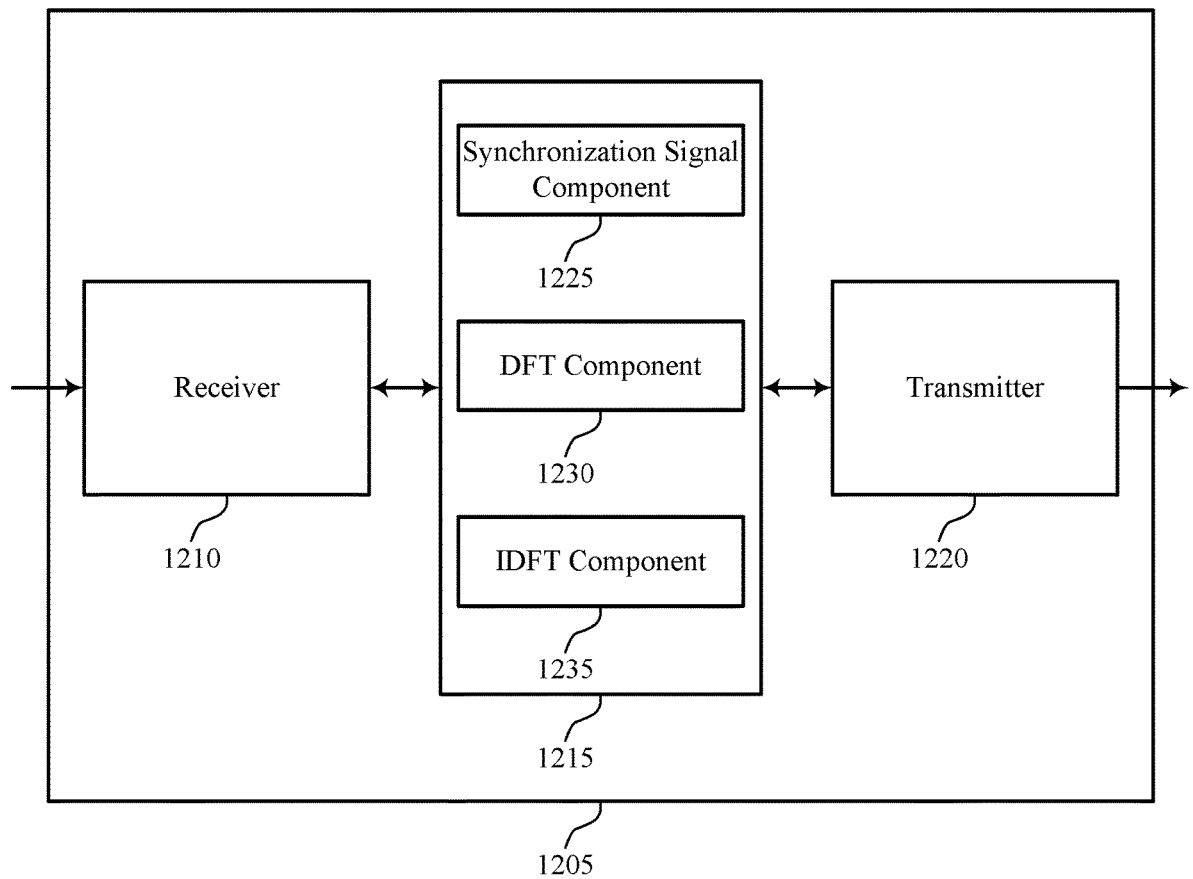

FIG. 12 shows a block diagram 1200 of a Wireless device 1205 that supports optimized secondary synchronization signal in accordance with various aspects of the present disclosure. Wireless device 1205 may be an example of aspects of a wireless device 1105 or a base station 105 as described with reference to FIGS. 1 and 11. Wireless device 1205 may include receiver 1210, base station communication manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to optimized secondary synchronization signal, etc.). Information may be passed on to other components of the device. The receiver 1210 may be an example of aspects of the transceiver 1435 described with reference to FIG. 14.

Base station communication manager 1215 may be an example of aspects of the base station communication manager 1415 described with reference to FIG. 14. Base station communication manager 1215 may also include synchronization signal component 1225, DFT component 1230, and IDFT component 1235.

Synchronization signal component 1225 may generate a synchronization signal, where the synchronization signal includes a set of time domain repetitions of a sequence and generate a synchronization signal. In some cases, the synchronization signal includes a single symbol including the set of time domain repetitions of the sequence.

DFT component 1230 may perform a discrete Fourier transform (DFT) precoding on the synchronization signal and append one or more expansion tone samples to the synchronization signal, where the FFT precoding or the IDFT is based on the one or more expansion tone samples. In some cases, the DFT precoding includes a fast Fourier transform (FFT) precoding or the IDFT includes an inverse fast Fourier transform (IFFT). In some cases, the one or more expansion tone samples include one or more cyclic expansion tone samples.

IDFT component 1235 may perform an inverse discrete Fourier transform (IDFT) on an output of the DFT precoding.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may include a single antenna, or it may include a set of antennas.

Figure 13:
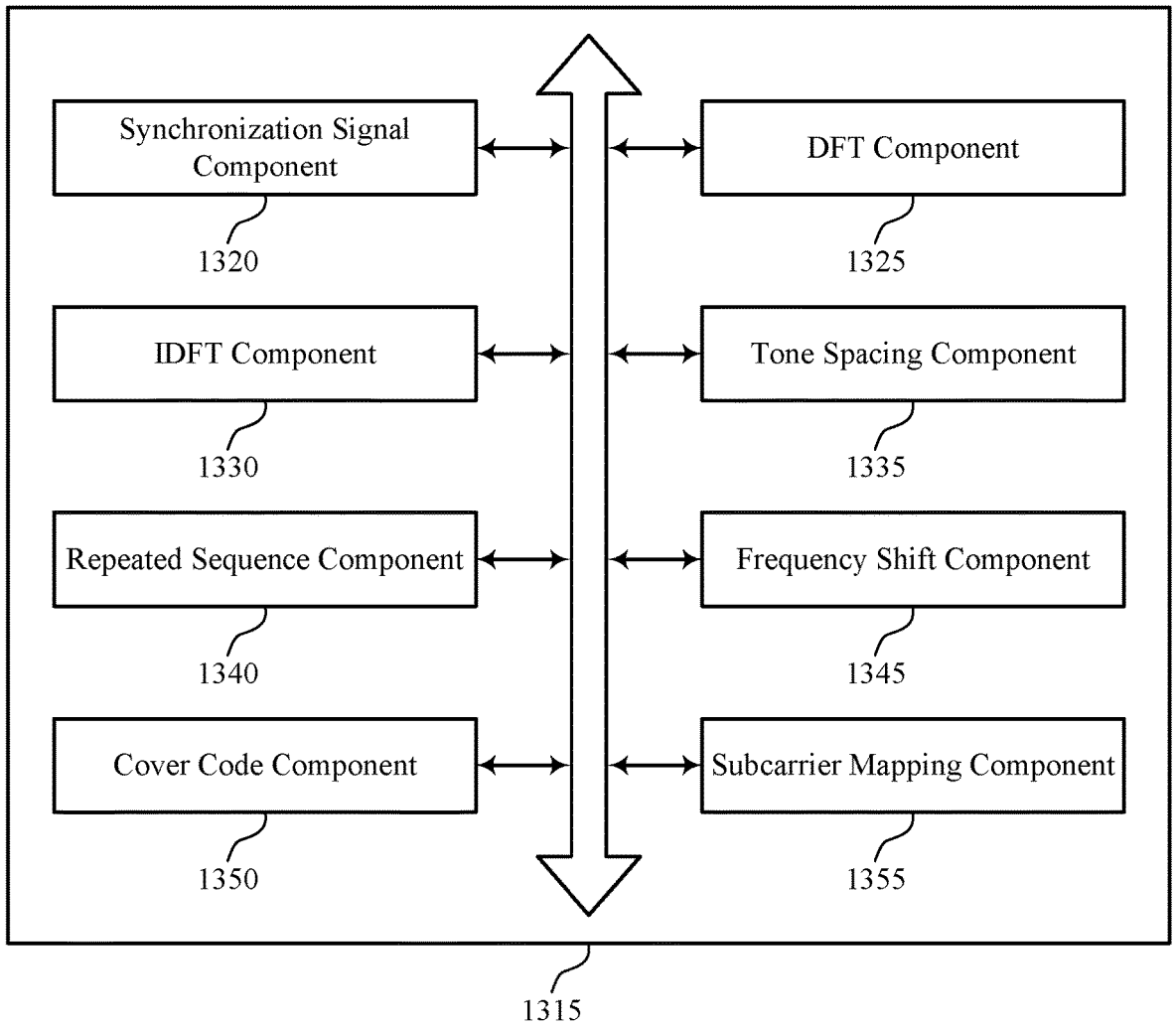

FIG. 13 shows a block diagram 1300 of a base station communication manager 1315 that supports optimized secondary synchronization signal in accordance with various aspects of the present disclosure. The base station communication manager 1315 may be an example of aspects of a base station communication manager 1415 described with reference to FIGS. 11, 12, and 14. The base station communication manager 1315 may include synchronization signal component 1320, DFT component 1325, IDFT component 1330, tone spacing component 1335, repeated sequence component 1340, frequency shift component 1345, cover code component 1350, and subcarrier mapping component 1355. Each of these modules may communicate, directly or indirectly, with one another (e.g., via one or more buses).

Synchronization signal component 1320 may generate a synchronization signal, where the synchronization signal includes a set of time domain repetitions of a sequence and generate a synchronization signal. In some cases, the synchronization signal includes a single symbol including the set of time domain repetitions of the sequence.

DFT component 1325 may perform a discrete Fourier transform (DFT) precoding on the synchronization signal and append one or more expansion tone samples to the synchronization signal, where the FFT precoding or the IDFT is based on the one or more expansion tone samples. In some cases, the DFT precoding includes a fast Fourier transform (FFT) precoding or the IDFT includes an inverse fast Fourier transform (IFFT). In some cases, the one or more expansion tone samples include one or more cyclic expansion tone samples. IDFT component 1330 may perform an inverse discrete Fourier transform (IDFT) on an output of the DFT precoding.

Tone spacing component 1335 may identify a set of tones for transmitting the synchronization signal, identify one or more information bits, and select a subset of the set of tones based on the one or more information bits, where the synchronization signal is transmitted using the subset of the set of tones. In some cases, the subset of the set of tones includes a subset of equidistant tones separated by a subset of empty tones that are not used to transmit the synchronization signal. In some cases, the synchronization signal includes a tone spacing that is greater than a tone spacing of an additional signal of a transmission and a symbol duration that is less than a symbol duration of an additional signal.

Repeated sequence component 1340 may generate a subsequence to be repeated within a synchronization signal. In some cases, the synchronization signal includes a set of symbols, where each of the set of symbols includes a time domain repetition of the sequence.

Frequency shift component 1345 may identify the frequency shift for each of the set of symbols based on an identifier of the additional synchronization signal. In some cases, each of the set of symbols is transmitted using a frequency shift that is different from a frequency shift for at least one symbol of the set of symbols.

Cover code component 1350 may select a cover code for the set of symbols of the synchronization signal, where the synchronization signal is transmitted based on the cover code and identify one or more information bits for the UE, where the cover code is selected based on the one or more information bits.

Subcarrier mapping component 1355 may perform a subcarrier mapping on the output of the DFT precoding, where performing the IDFT on the output of the DFT precoding includes performing the IDFT on an output of the subcarrier mapping.

Figure 14:
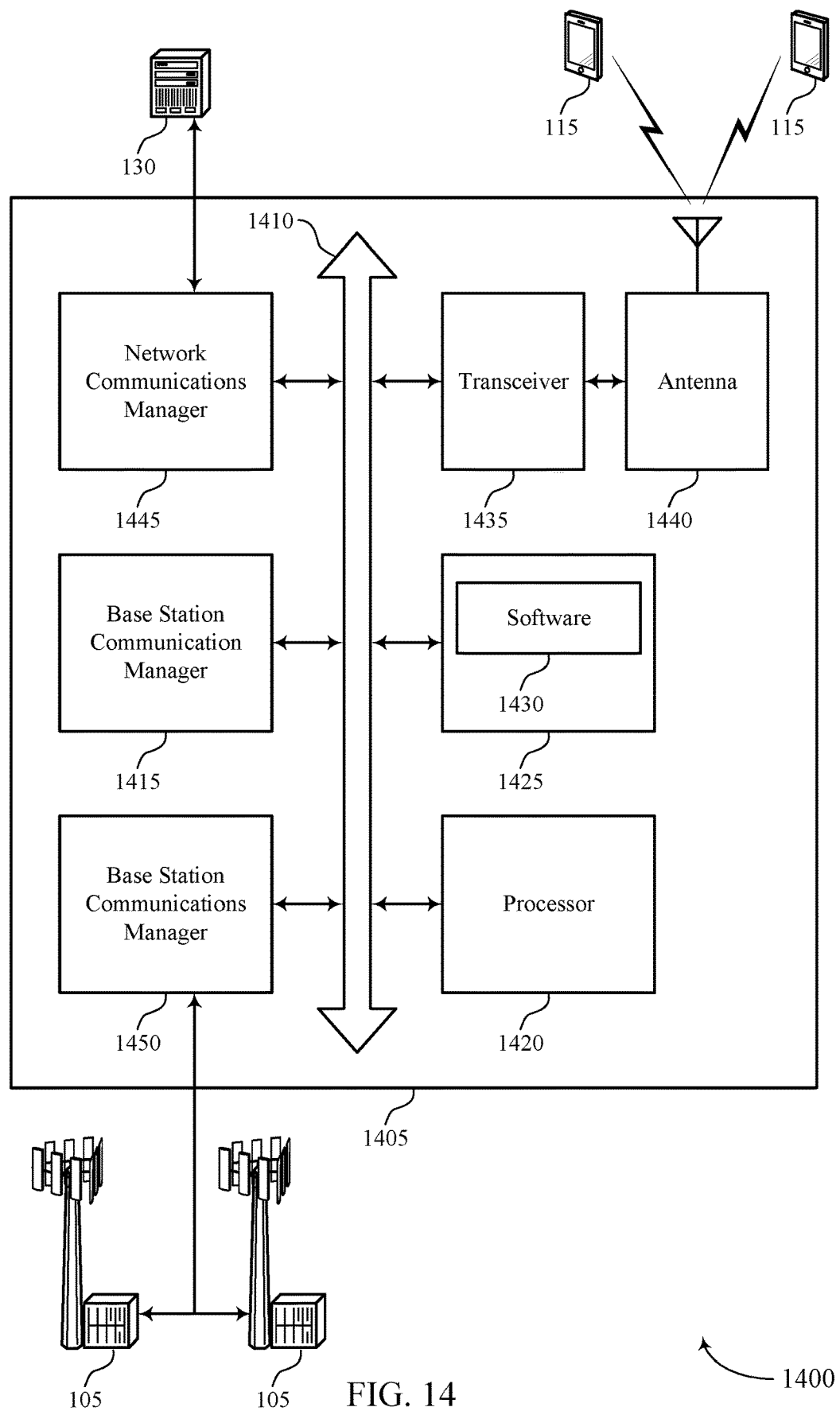
FIG. 14 illustrates a block diagram of a system including a base station that supports optimized secondary synchronization signal in accordance with aspects of the present disclosure.

FIG. 14 shows a diagram of a system 1400 including a device 1405 that supports optimized secondary synchronization signal in accordance with various aspects of the present disclosure. Device 1405 may be an example of or include the components of a base station 105 as described above, e.g., with reference to FIG. 1.

Device 1405 may include components for bi-directional voice and data communications including components for transmitting and receiving communications, including base station communication manager 1415, processor 1420, memory 1425, software 1430, transceiver 1435, antenna 1440, network communications manager 1445, and base station communications manager 1450.

Processor 1420 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., function or tasks supporting optimized secondary synchronization signal). 1420.

Memory 1425 may include random access memory (RAM) and read only memory (ROM). The memory 1425 may store computer-readable, computer-executable software 1430 including instructions that, when executed, cause the processor to perform various functions described herein. In some cases, the memory 1425 can contain, among other things, a Basic Input-Output system (BIOS) which may control basic hardware and/or software operation such as the interaction with peripheral components or devices.

Software 1430 may include code to implement aspects of the present disclosure, including code to support optimized secondary synchronization signal. Software 1430 can be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications module 1445 may manage the transfer of data communications for client devices, such as one or more UEs 115.

Base station communications manager 1450 may manage communications with other base station 105, and may include a controller or scheduler for controlling communications with UEs 115 in cooperation with other base stations 105. For example, the base station communications manager 1450 may coordinate scheduling for transmissions to UEs 115 for various interference mitigation techniques such as beamforming or joint transmission. In some examples, base station communications manager 1450 may provide an X2 interface within an LTE/LTE-A wireless communication network technology to provide communication between base stations 105.

Figure 15:
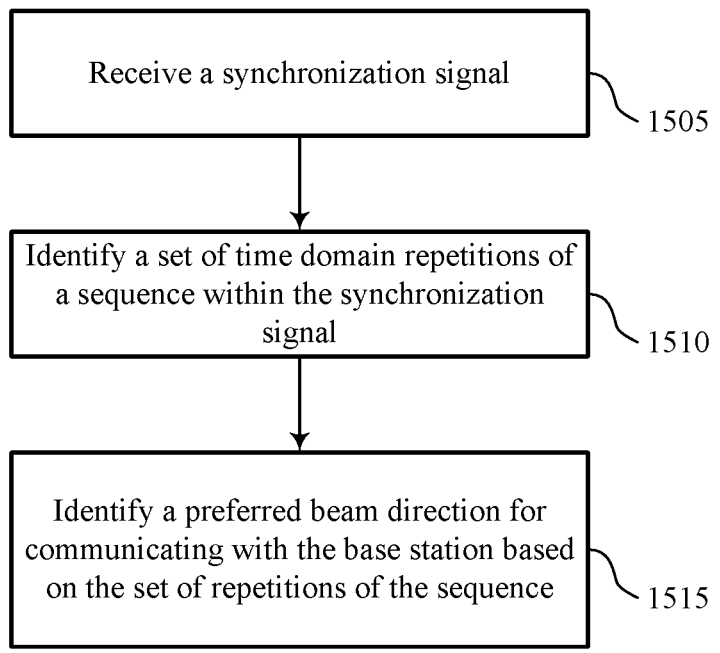
FIGS. 15 through 20 illustrate methods for optimized secondary synchronization signal in accordance with aspects of the present disclosure.

FIG. 15 shows a flowchart illustrating a method 1500 for optimized secondary synchronization signal in accordance with various aspects of the present disclosure. The operations of method 1500 may be implemented by a UE 115 or its components as described herein. For example, the operations of method 1500 may be performed by a UE communication manager as described with reference to FIGS. 7 through 10. In some examples, a UE 115 may execute a set of codes to control the functional elements of the device to perform the functions described below. Additionally or alternatively, the UE 115 may perform aspects the functions described below using special-purpose hardware.

At block 1505, the UE 115 may receive a synchronization signal. The operations of block 1505 may be performed according to the methods described with reference to FIGS. 1 through 6. In certain examples, aspects of the operations of block 1505 may be performed by a receiver as described with reference to FIGS. 7 through 10.

At block 1510, the UE 115 may identify a set of time domain repetitions of a sequence within the synchronization signal. The operations of block 1510 may be performed according to the methods described with reference to FIGS. 1 through 6. In certain examples, aspects of the operations of block 1510 may be performed by a repeated sequence component as described with reference to FIGS. 7 through 10.

At block 1515, the UE 115 may identify a preferred beam direction for communicating with the base station based on the set of repetitions of the sequence. The operations of block 1515 may be performed according to the methods described with reference to FIGS. 1 through 6. In certain examples, aspects of the operations of block 1515 may be performed by a beam direction component as described with reference to FIGS. 7 through 10.

Figure 16:
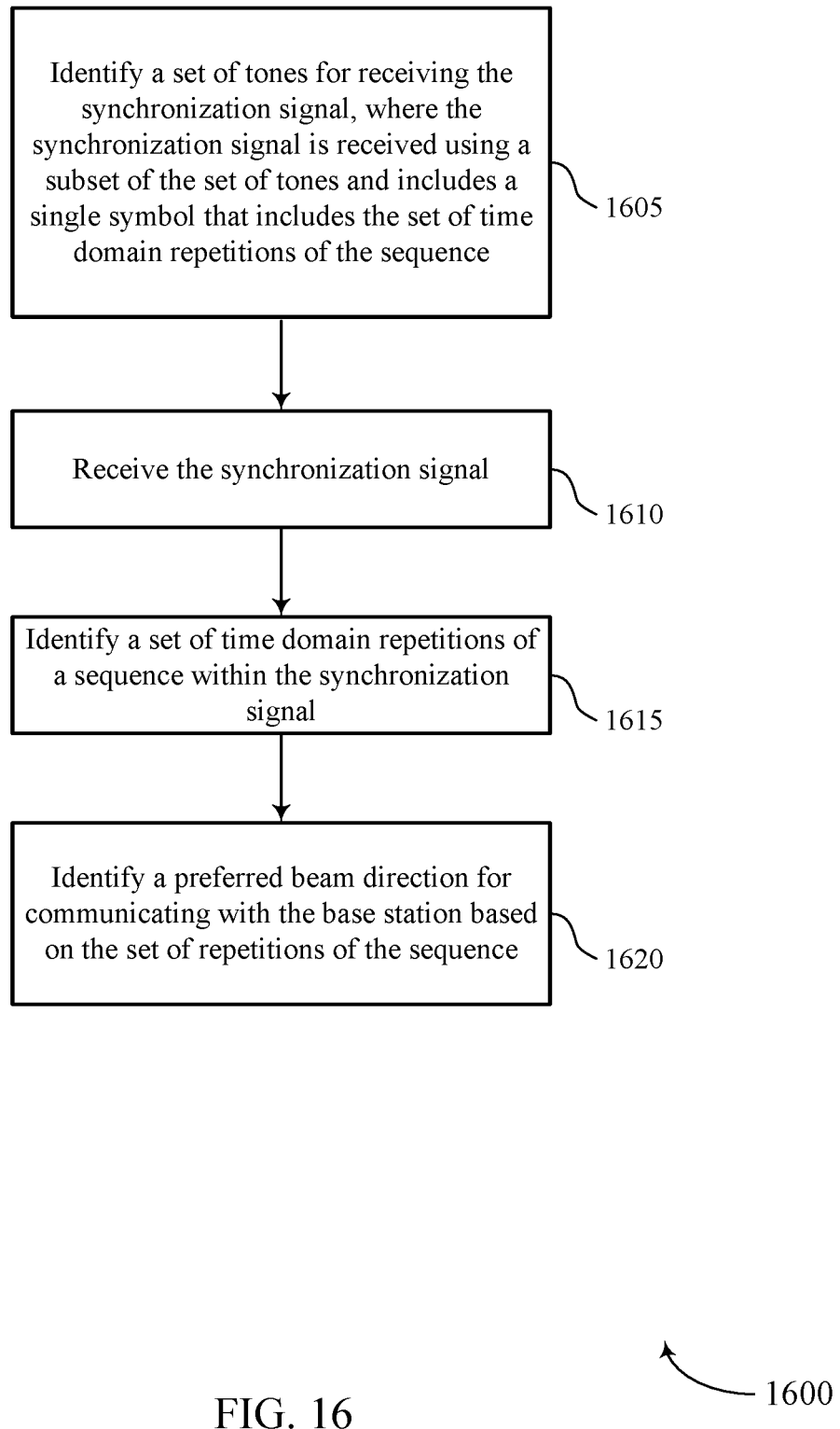

FIG. 16 shows a flowchart illustrating a method 1600 for optimized secondary synchronization signal in accordance with various aspects of the present disclosure. The operations of method 1600 may be implemented by a UE 115 or its components as described herein. For example, the operations of method 1600 may be performed by a UE communication manager as described with reference to FIGS. 7 through 10. In some examples, a UE 115 may execute a set of codes to control the functional elements of the device to perform the functions described below. Additionally or alternatively, the UE 115 may perform aspects the functions described below using special-purpose hardware.

At block 1605, the UE 115 may identify a set of tones for receiving a synchronization signal, where the synchronization signal is received using a subset of the set of tones and includes a single symbol that includes the set of time domain repetitions of the sequence. The operations of block 1605 may be performed according to the methods described with reference to FIGS. 1 through 6. In certain examples, aspects of the operations of block 1605 may be performed by a tone spacing component as described with reference to FIGS. 7 through 10.

At block 1610, the UE 115 may receive the synchronization signal. The operations of block 1610 may be performed according to the methods described with reference to FIGS. 1 through 6. In certain examples, aspects of the operations of block 1610 may be performed by a receiver as described with reference to FIGS. 7 through 10.

At block 1615, the UE 115 may identify a set of time domain repetitions of a sequence within the synchronization signal. The operations of block 1615 may be performed according to the methods described with reference to FIGS. 1 through 6. In certain examples, aspects of the operations of block 1615 may be performed by a repeated sequence component as described with reference to FIGS. 7 through 10.

At block 1620, the UE 115 may identify a preferred beam direction for communicating with the base station based on the set of repetitions of the sequence. The operations of block 1620 may be performed according to the methods described with reference to FIGS. 1 through 6. In certain examples, aspects of the operations of block 1620 may be performed by a beam direction component as described with reference to FIGS. 7 through 10.

Figure 17:
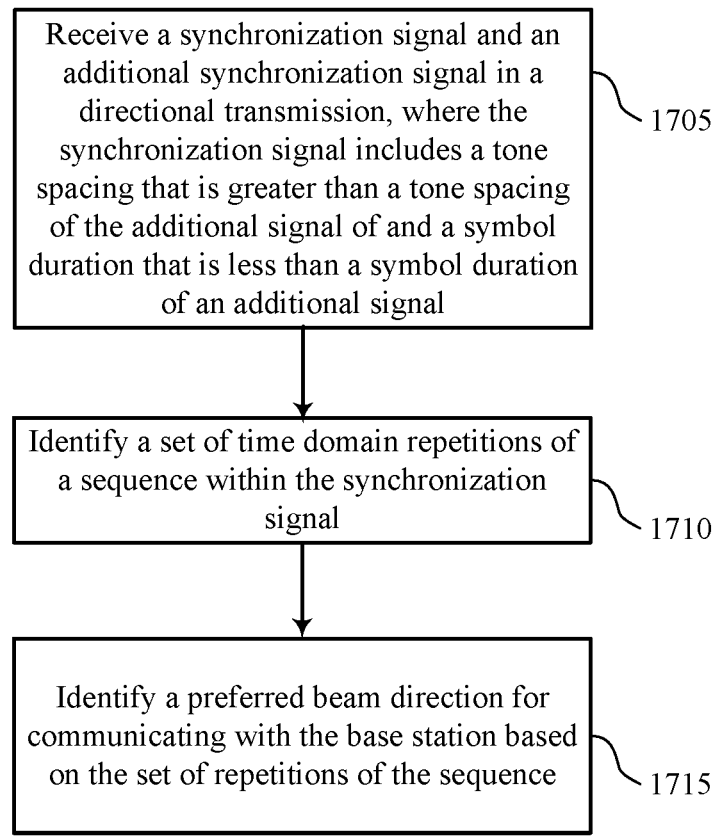

FIG. 17 shows a flowchart illustrating a method 1700 for optimized secondary synchronization signal in accordance with various aspects of the present disclosure. The operations of method 1700 may be implemented by a UE 115 or its components as described herein. For example, the operations of method 1700 may be performed by a UE communication manager as described with reference to FIGS. 7 through 10. In some examples, a UE 115 may execute a set of codes to control the functional elements of the device to perform the functions described below. Additionally or alternatively, the UE 115 may perform aspects the functions described below using special-purpose hardware.

At block 1705, the UE 115 may receive a synchronization signal and an additional synchronization signal in a directional transmission. In some cases, the synchronization signal includes a tone spacing that is greater than a tone spacing of the additional signal of and a symbol duration that is less than a symbol duration of an additional signal. The operations of block 1705 may be performed according to the methods described with reference to FIGS. 1 through 6. In certain examples, aspects of the operations of block 1705 may be performed by a receiver as described with reference to FIGS. 7 through 10.

At block 1710, the UE 115 may identify a set of time domain repetitions of a sequence within the synchronization signal. The operations of block 1710 may be performed according to the methods described with reference to FIGS. 1 through 6. In certain examples, aspects of the operations of block 1710 may be performed by a repeated sequence component as described with reference to FIGS. 7 through 10.

At block 1715, the UE 115 may identify a preferred beam direction for communicating with the base station based on the set of repetitions of the sequence. The operations of block 1715 may be performed according to the methods described with reference to FIGS. 1 through 6. In certain examples, aspects of the operations of block 1715 may be performed by a beam direction component as described with reference to FIGS. 7 through 10.

Figure 18:
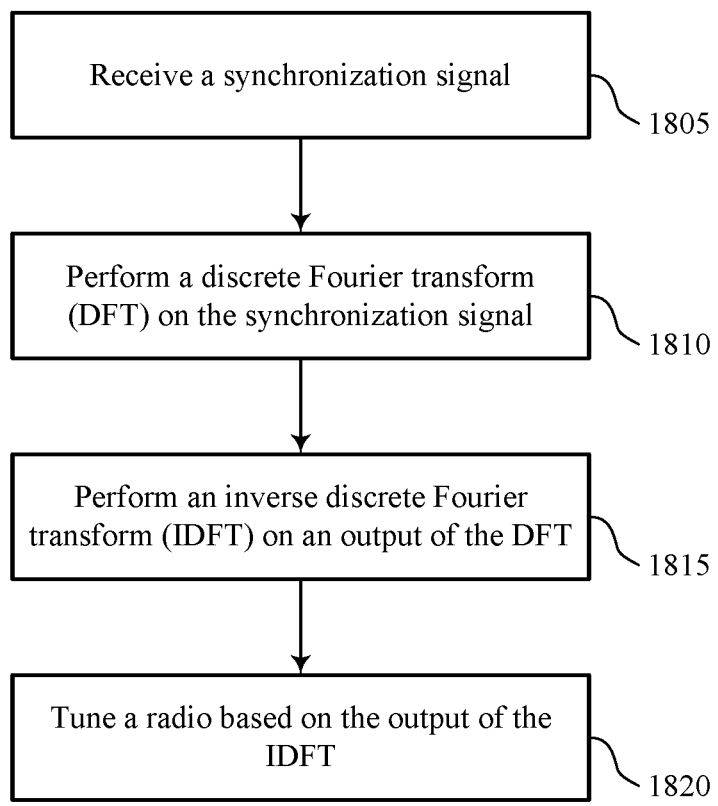

FIG. 18 shows a flowchart illustrating a method 1800 for optimized secondary synchronization signal in accordance with various aspects of the present disclosure. The operations of method 1800 may be implemented by a UE 115 or its components as described herein. For example, the operations of method 1800 may be performed by a UE communication manager as described with reference to FIGS. 7 through 10. In some examples, a UE 115 may execute a set of codes to control the functional elements of the device to perform the functions described below. Additionally or alternatively, the UE 115 may perform aspects the functions described below using special-purpose hardware.

At block 1805, the UE 115 may receive a synchronization signal. The operations of block 1805 may be performed according to the methods described with reference to FIGS. 1 through 6. In certain examples, aspects of the operations of block 1805 may be performed by a receiver as described with reference to FIGS. 7 through 10.

At block 1810, the UE 115 may perform a discrete Fourier transform (DFT) on the synchronization signal. The operations of block 1810 may be performed according to the methods described with reference to FIGS. 1 through 6. In certain examples, aspects of the operations of block 1810 may be performed by a DFT component as described with reference to FIGS. 7 through 10.

At block 1815, the UE 115 may perform an inverse discrete Fourier transform (IDFT) on an output of the DFT. The operations of block 1815 may be performed according to the methods described with reference to FIGS. 1 through 6. In certain examples, aspects of the operations of block 1815 may be performed by a IDFT component as described with reference to FIGS. 7 through 10.

At block 1820, the UE 115 may tune a radio based on the output of the IDFT. The operations of block 1820 may be performed according to the methods described with reference to FIGS. 1 through 6. In certain examples, aspects of the operations of block 1820 may be performed by a synchronization component as described with reference to FIGS. 7 through 10.

Figure 19:
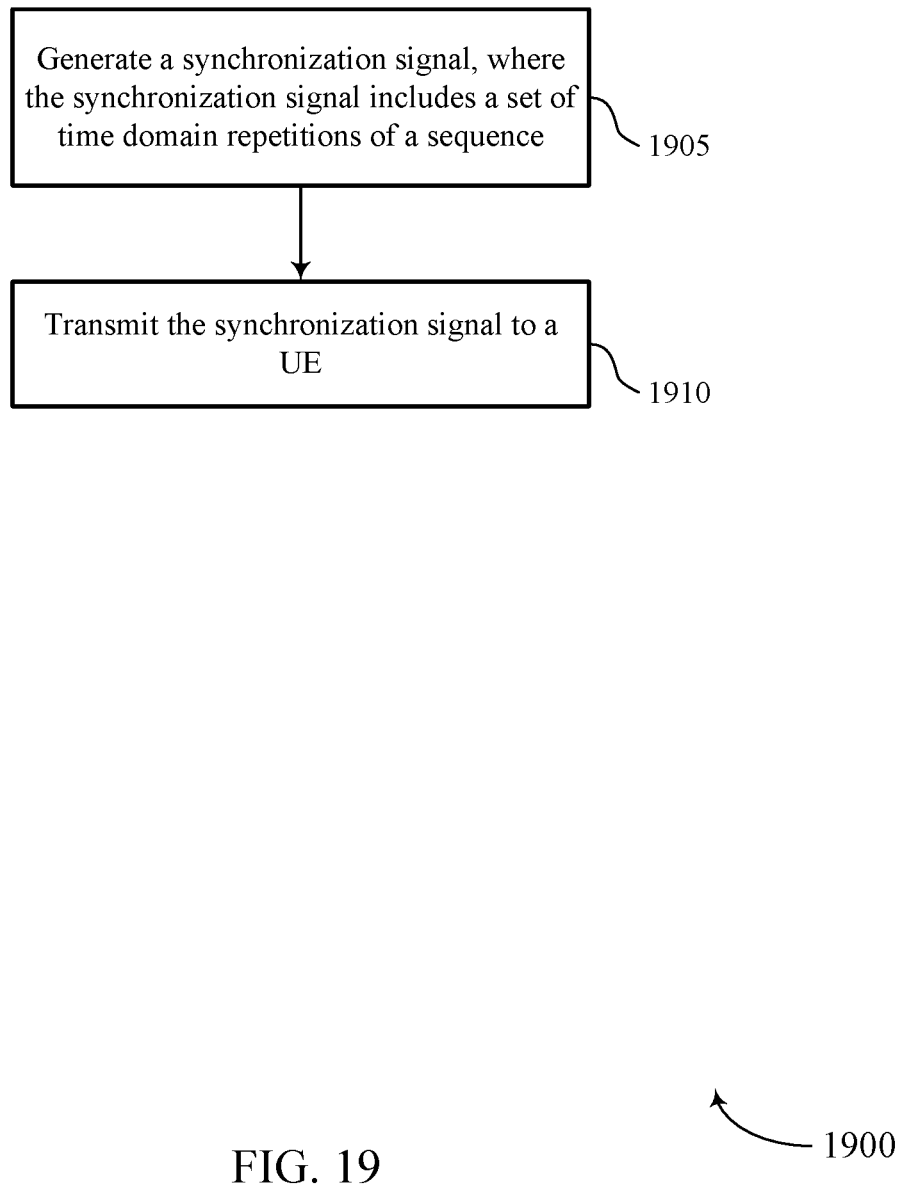

FIG. 19 shows a flowchart illustrating a method 1900 for optimized secondary synchronization signal in accordance with various aspects of the present disclosure. The operations of method 1900 may be implemented by a base station 105 or its components as described herein. For example, the operations of method 1900 may be performed by a base station communication manager as described with reference to FIGS. 11 through 14. In some examples, a base station 105 may execute a set of codes to control the functional elements of the device to perform the functions described below. Additionally or alternatively, the base station 105 may perform aspects the functions described below using special-purpose hardware.

At block 1905, the base station 105 may generate a synchronization signal, where the synchronization signal includes a set of time domain repetitions of a sequence. The operations of block 1905 may be performed according to the methods described with reference to FIGS. 1 through 6. In certain examples, aspects of the operations of block 1905 may be performed by a synchronization signal component as described with reference to FIGS. 11 through 14.

At block 1910, the base station 105 may transmit the synchronization signal to a UE. The operations of block 1910 may be performed according to the methods described with reference to FIGS. 1 through 6. In certain examples, aspects of the operations of block 1910 may be performed by a transmitter as described with reference to FIGS. 11 through 14.

Figure 20:
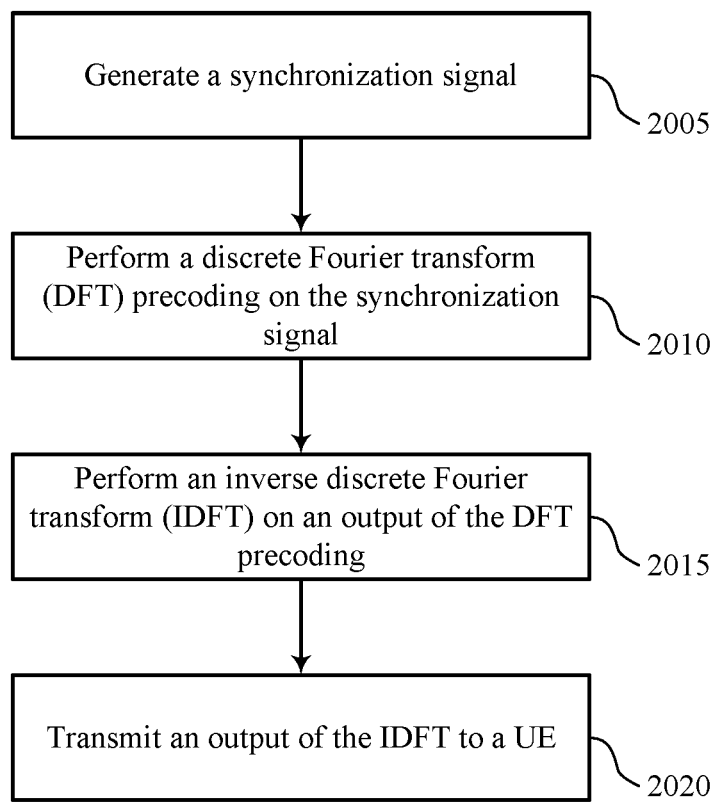

FIG. 20 shows a flowchart illustrating a method 2000 for optimized secondary synchronization signal in accordance with various aspects of the present disclosure. The operations of method 2000 may be implemented by a base station 105 or its components as described herein. For example, the operations of method 2000 may be performed by a base station communication manager as described with reference to FIGS. 11 through 14. In some examples, a base station 105 may execute a set of codes to control the functional elements of the device to perform the functions described below. Additionally or alternatively, the base station 105 may perform aspects the functions described below using special-purpose hardware.

At block 2005, the base station 105 may generate a synchronization signal. The operations of block 2005 may be performed according to the methods described with reference to FIGS. 1 through 6. In certain examples, aspects of the operations of block 2005 may be performed by a synchronization signal component as described with reference to FIGS. 11 through 14.

At block 2010, the base station 105 may perform a discrete Fourier transform (DFT) precoding on the synchronization signal. The operations of block 2010 may be performed according to the methods described with reference to FIGS. 1 through 6. In certain examples, aspects of the operations of block 2010 may be performed by a DFT component as described with reference to FIGS. 11 through 14.

At block 2015, the base station 105 may perform an inverse discrete Fourier transform (IDFT) on an output of the DFT precoding. The operations of block 2015 may be performed according to the methods described with reference to FIGS. 1 through 6. In certain examples, aspects of the operations of block 2015 may be performed by a IDFT component as described with reference to FIGS. 11 through 14.

At block 2020, the base station 105 may transmit an output of the IDFT to a UE. The operations of block 2020 may be performed according to the methods described with reference to FIGS. 1 through 6. In certain examples, aspects of the operations of block 2020 may be performed by a transmitter as described with reference to FIGS. 11 through 14.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment, comprising:
   receiving a synchronization signal comprising a plurality of time domain repetitions of a sequence by a plurality of receive beams, the receiving comprising:
      switching between receive beams of the plurality of receive beams for each time domain repetition of the plurality of time domain repetitions of the sequence to receive the synchronization signal, wherein a quantity of the plurality of time domain repetitions of the sequence is equal to a value of a first tone spacing of the synchronization signal; and
   identifying a preferred beam direction for communicating with a base station based at least in part on the plurality of time domain repetitions of the sequence and the plurality of receive beams, the synchronization signal comprising the first tone spacing that is greater than a second tone spacing of an additional signal of a transmission and a first symbol duration that is less than a second symbol duration of the additional signal.

2. The method of claim 1, further comprising:
   identifying a plurality of tones for receiving the synchronization signal, wherein the synchronization signal is received using a subset of the plurality of tones and comprises a single symbol that includes the plurality of time domain repetitions of the sequence.

3. The method of claim 2, further comprising:
   identifying a plurality of subsets of tones of the plurality of tones including the subset of the plurality of tones, each subset of tones of the plurality of subsets of tones associated with conveying different information bits; and
   identifying one or more information bits based at least in part on receiving the synchronization signal using the subset of the plurality of tones.

4. The method of claim 2, further comprising:
   identifying the subset of the plurality of tones based at least in part on an identifier of an additional synchronization signal of a directional transmission.

5. The method of claim 2, wherein the subset of the plurality of tones comprises a subset of equidistant tones separated by a subset of empty tones that are not used to transmit the synchronization signal.

6. The method of claim 1, wherein the synchronization signal comprises a plurality of symbols, wherein each of the plurality of symbols comprises a time domain repetition of the sequence.

7. The method of claim 6, wherein each of the plurality of symbols is received using a first frequency shift that is different from a frequency shift for at least one symbol of the plurality of symbols.

8. The method of claim 7, further comprising:
   identifying the frequency shift for each of the plurality of symbols based at least in part on an identifier of the additional signal.

9. The method of claim 6, further comprising:
   identifying a cover code for the plurality of symbols of the synchronization signal; and
   performing a correlation procedure on the synchronization signal based at least in part on the cover code.

10. The method of claim 9, wherein the cover code is identified based at least in part on an identifier of a previous synchronization signal.

11. The method of claim 6, further comprising:
    identifying a cover code for the plurality of symbols of the synchronization signal based at least in part on a correlation procedure; and
    identifying one or more bits of information based at least in part on the cover code.

12. The method of claim 1, wherein the synchronization signal comprises a secondary synchronization signal (SSS).

13. A method for wireless communication at a user equipment, comprising:
    receiving a synchronization signal comprising a base sequence of a first number of tones in a frequency domain and one or more expansion tone samples appended to the base sequence in the frequency domain;
    performing a fast Fourier transform (FFT) on the synchronization signal, wherein peak to average power ratio of the synchronization signal is reduced based at least in part on the FFT;
    performing an inverse fast Fourier transform (IFFT) on an output of the FFT to obtain an output of the IFFT, wherein performing the FFT and the IFFT is based at least in part on the synchronization signal comprising the base sequence of the first number of tones and the one or more expansion tone samples appended to the base sequence;
    and
    tuning a radio based at least in part on the base sequence of the first number of tones and the one or more expansion tone samples appended to the base sequence of the synchronization signal.

14. The method of claim 13, further comprising:
    performing a subcarrier demapping on the output of the FFT, wherein performing the IFFT on the output of the FFT comprises performing the IFFT on an output of the subcarrier demapping.

15. The method of claim 13, wherein the synchronization signal comprises a secondary synchronization signal (SSS).

16. A method for wireless communication at a base station, comprising:
- identifying a plurality of tones in a frequency domain for transmitting a synchronization signal;
- dividing the plurality of tones in the frequency domain into a plurality of subsets of tones, each subset of tones of the plurality of subsets of tones associated with conveying different information bits;
- identifying one or more information bits;
- selecting a first subset of the plurality of subsets of tones based at least in part on the one or more information bits;
- generating the synchronization signal, wherein the synchronization signal includes a plurality of time domain repetitions of a sequence;
- transmitting the synchronization signal to a user equipment (UE) using the first subset of the plurality of subsets of tones, the synchronization signal comprising a tone spacing that is greater than a tone spacing of an additional signal of a transmission and a symbol duration that is less than a symbol duration of the additional signal; and
- communicating with the UE in a preferred beam direction based at least in part on the plurality of time domain repetitions of the sequence and a plurality of receive beams that are switched at the UE between the plurality of time domain repetitions.

17. The method of claim 16, wherein the synchronization signal comprises a single symbol comprising the plurality of time domain repetitions of the sequence.

18. The method of claim 16, wherein the first subset of the plurality of subsets of tones comprises a subset of equidistant tones separated by a subset of empty tones that are not used to transmit the synchronization signal.

19. The method of claim 16, wherein the synchronization signal comprises a secondary synchronization signal (SSS).

20. A method for wireless communication at a base station, comprising:
- generating a synchronization signal comprising a base sequence of a first number of tones in a frequency domain;
- appending one or more expansion tone samples to the base sequence of the synchronization signal to increase a length of the base sequence in the frequency domain;
- performing a fast Fourier transform (FFT) precoding on the synchronization signal, wherein peak to average power ratio of the synchronization signal is reduced based at least in part on the FFT precoding;
- performing an inverse fast Fourier transform (IFFT) on an output of the FFT precoding, wherein performing the FFT precoding and the IFFT is based at least in part on the one or more expansion tone samples increasing the length of the base sequence in the frequency domain; and
- transmitting an output of the IFFT to a user equipment (UE).

21. The method of claim 20, further comprising:
- performing a subcarrier mapping on the output of the FFT precoding, wherein performing the IFFT on the output of the FFT precoding comprises performing the IFFT on an output of the subcarrier mapping.

22. The method of claim 20, wherein the one or more expansion tone samples comprise one or more cyclic expansion tone samples.

23. The method of claim 20, wherein the synchronization signal comprises a secondary synchronization signal (SSS).

24. The method of claim 13, wherein a summation of the first number of tones of the base sequence and the one or more expansion tone samples appended to the base sequence is equal to a second number, the second number being a power of two.

25. The method of claim 16, wherein each subset of tones of the plurality of subsets of tones includes a same quantity of tones and has a same tone spacing.

26. The method of claim 20, wherein a summation of the first number of tones of the base sequence and the one or more expansion tone samples appended to the base sequence is equal to a second number, the second number being a power of two.

* * * * *